United States Patent
Wang et al.

(10) Patent No.: US 12,149,485 B2
(45) Date of Patent: Nov. 19, 2024

(54) COMMUNICATIONS METHOD AND APPARATUS

(71) Applicant: HUAWEI TECHNOLOGIES CO., LTD., Guangdong (CN)

(72) Inventors: Yuchen Wang, Shenzhen (CN); Chenwan Li, Beijing (CN); Yiling Wu, Beijing (CN); Zhenyu Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 699 days.

(21) Appl. No.: 17/366,815

(22) Filed: Jul. 2, 2021

(65) Prior Publication Data

US 2021/0336751 A1   Oct. 28, 2021

Related U.S. Application Data

(63) Continuation of application No. PCT/CN2019/070713, filed on Jan. 7, 2019.

(51) Int. Cl.
*H04L 5/00* (2006.01)
*H04L 27/26* (2006.01)
(Continued)

(52) U.S. Cl.
CPC ........ *H04L 5/0092* (2013.01); *H04L 27/2657* (2013.01); *H04W 72/0453* (2013.01); *H04L 5/14* (2013.01)

(58) Field of Classification Search
CPC ..... H04L 5/0092; H04L 27/2657; H04L 5/14; H04L 5/001; H04W 72/0453
See application file for complete search history.

(56) References Cited

U.S. PATENT DOCUMENTS

| 2016/0255630 | A1* | 9/2016 | Etemad | H04L 47/11 370/329 |
|---|---|---|---|---|
| 2018/0092043 | A1 | 3/2018 | Yerramalli et al. | |
| 2019/0320440 | A1* | 10/2019 | Tang | H04L 5/0094 |

FOREIGN PATENT DOCUMENTS

| CN | 1308439 A | 8/2001 |
|---|---|---|
| CN | 101801064 A | 8/2010 |

(Continued)

OTHER PUBLICATIONS

Office Action issued in Chinese Application No. 201980074663.9 on Nov. 22, 2021, 7 pages.

(Continued)

*Primary Examiner* — Rina C Pancholi
(74) *Attorney, Agent, or Firm* — Fish & Richardson P.C.

(57) ABSTRACT

The present disclosure discloses example communications methods and apparatuses. One example method includes obtaining effective carrier indication information from a network device. An effective carrier frequency is obtained based on the effective carrier indication information, where the effective carrier indication information includes first information, second information, and third information. The first information includes first indication information, second indication information, or third indication information. The first indication information is used to indicate that carriers are not paired, the second indication information is used to indicate that carriers are paired, the third indication information is used to indicate a paired carrier frequency spacing, the second information is used to indicate a start carrier frequency, and the third information is used to indicate a frequency domain location of an effective carrier relative to a start carrier.

19 Claims, 25 Drawing Sheets

(51) Int. Cl.
 *H04W 72/0453* (2023.01)
 *H04L 5/14* (2006.01)

(56) References Cited

FOREIGN PATENT DOCUMENTS

| | | | |
|---|---|---|---|
| CN | 102083205 | A | 6/2011 |
| CN | 104980260 | A | 10/2015 |
| EP | 3226621 | B1 | 12/2019 |
| WO | 2011035420 | A1 | 3/2011 |
| WO | 2018085045 | A1 | 5/2018 |
| WO | 2018128426 | A1 | 7/2018 |

OTHER PUBLICATIONS

Spreadtrum Communications, "Clarification on point A and carrier channel configuration for DL in SIB1," 3GPP TSG-RAN WG2 Meeting #102, R2-1807069, Busan, Korea, May 21-25, 2018, 8 pages.
Extended European Search Report issued in European Application No. 19909476.4 on Nov. 19, 2021, 8 pages.
PCT International Search Report and Written Opinion in International Appln. No. PCT/CN2019/070713, dated Jul. 15, 2019, 15 pages (With English Translation).

\* cited by examiner

COMMUNICATIONS METHOD AND APPARATUS

CROSS-REFERENCE TO RELATED APPLICATIONS

This application is a continuation of International Application No. PCT/CN2019/070713, filed on Jan. 7, 2019, the disclosure of which is hereby incorporated by reference in its entirety.

TECHNICAL FIELD

This application relates to the field of communications technologies, and in particular, to a communications method and apparatus.

BACKGROUND

In some communication scenarios, effective carrier distribution is complex. For example, wireless communication for electric power services outside China is supported by a spectrum of 400 MHz. On this spectrum, there are relatively great differences between effective carrier frequencies in different countries. For example, the differences in the effective carrier frequencies in the different countries may include:

1. a relatively great difference in start locations of the effective carrier frequencies;
2. a plurality of cases such as paired carriers or unpaired carriers;
3. a relatively great difference in frequency spacings between paired carriers when carriers are allocated in pairs;
4. a difference in duplex modes for paired carriers;
5. a difference that available carrier frequencies may be continuous or discontinuous, where in addition, a spacing between discontinuous carriers is random; and
6. insufficient available carriers in some scenarios.

How a network and a terminal determine an effective carrier to flexibly adapt to various complex scenarios is a problem to be resolved urgently.

SUMMARY

Embodiments of this application provide a communications method and apparatus. The method and the apparatus can be flexibly applied to various complex effective carrier distribution, to indicate an effective carrier, and reduce signaling overheads between a network device and a terminal device.

To achieve the foregoing objective, the following technical solutions are used in the embodiments of this application.

According to a first aspect, this application provides a communications method.

In a possible design, the method may include: obtaining effective carrier indication information from a network device, and obtaining an effective carrier frequency based on the effective carrier indication information. The effective carrier indication information includes first information, second information, and third information. The first information includes first indication information, second indication information, or third indication information. The first indication information is used to indicate that carriers are not paired, the second indication information is used to indicate that carriers are paired, and the third indication information is used to indicate a paired carrier frequency spacing. The second information is used to indicate a start carrier frequency. The third information is used to indicate a frequency domain location of an effective carrier relative to a start carrier.

In this method, a terminal device determines the effective carrier frequency by using the effective carrier indication information obtained from the network device, where the effective carrier indication information may indicate whether carriers are paired, the paired carrier frequency spacing, the start carrier frequency, and the frequency domain location of the effective carrier relative to the start carrier. In this way, the effective carrier indication information may indicate effective carrier frequencies in various complex scenarios.

According to a second aspect, this application provides a communications method.

In a possible design, the method may include: determining effective carrier indication information, and sending the effective carrier indication information to a terminal device, where the effective carrier indication information is used by the terminal device to determine an effective carrier frequency. The effective carrier indication information includes first information, second information, and third information. The first information includes first indication information, second indication information, or third indication information. The first indication information is used to indicate that carriers are not paired, the second indication information is used to indicate that carriers are paired, and the third indication information is used to indicate a paired carrier frequency spacing. The second information is used to indicate a start carrier frequency. The third information is used to indicate a frequency domain location of an effective carrier relative to a start carrier.

In this method, a network device sends the effective carrier indication information to the terminal device, where the effective carrier indication information is used by the terminal device to determine the effective carrier frequency, and the effective carrier indication information may indicate whether carriers are paired, the paired carrier frequency spacing, the start carrier frequency, and the frequency domain location of the effective carrier relative to the start carrier. In this way, the effective carrier indication information may indicate effective carrier frequencies in various complex scenarios.

With reference to the first aspect and the second aspect, in a possible design, the third information includes fourth indication information. When the first information includes the first indication information, the fourth indication information is used to indicate the effective carrier frequency. When the first information includes the second indication information or the third indication information, the fourth indication information is used to indicate a frequency of a first effective carrier, and the effective carrier includes w first effective carriers and w second effective carriers that are in a one-to-one correspondence with each other, where a frequency spacing between one first effective carrier and one second effective carrier that are in a one-to-one correspondence with each other is the paired carrier frequency spacing, and w>0. In this method, effective carrier indication is performed through differentiation between paired carriers and unpaired carriers.

With reference to the first aspect and the second aspect, in a possible design, the fourth indication information includes L bits, the L bits include q indication values, and the q indication values are used to indicate carrier frequencies of q or less than q effective carriers. An $i^{th}$ indication value is used to indicate that a frequency of an $i^{th}$ effective carrier is $(n_i+(t_i-1)\times(2^m-1))\times\Delta f+f_{i-1}$. The $i^{th}$ indication value includes $t_i \times m$ bits, where i=1, 2, ..., q, 1<=q<=L/m, and $$L >= \sum_{i=1}^{q} t_i \times m > 0.$$

A value of $n_i$ is indicated by a $((t_i-1)\times m+1)^{th}$ bit to a $(t_i \times m)^{th}$ bit that are of the $i^{th}$ indication value. $\Delta f$ is a carrier or subcarrier frequency spacing. When i>1, $f_{i-1}$ is an effective carrier frequency indicated by an $(i-1)^{th}$ indication value; or when i=1, $f_{i-1}$ is the start carrier frequency.

In this method, the L bits are used to indicate relative locations of the effective carrier frequency and the start carrier frequency, and the L bits include the q indication values that may indicate the q or less than q effective carrier frequencies. Each indication value indicates a frequency spacing between two adjacent effective carriers, and a range of a frequency spacing indicated by m bits may be 0 to $2^m \times \Delta f$, that is, a relatively small quantity of bits are used to indicate an effective carrier frequency spacing in a relatively large range. This method can be applied to various complex effective carrier frequency distribution, reduce a quantity of bits, and reduce signaling overheads between the network device and the terminal device.

In addition, some indication values in the q indication values may be greater than m bits, that is, q<L/m. An indication value greater than m bits may be used to indicate that a frequency spacing between effective carriers is greater than or equal to $2^m \times \Delta f$.

With reference to the first aspect and the second aspect, in a possible design, the third information includes fifth indication information, the fifth indication information includes Z bits, and each bit includes a first value or a second value. When the first information includes the second indication information or the third indication information, an $r^{th}$ bit is indicated by a first value, where a carrier frequency with a frequency spacing that is between the start carrier frequency and the carrier frequency and that is equal to a carrier or subcarrier frequency spacing multiplied by r is a frequency of a first effective carrier; and an $s^{th}$ bit is indicated by a second value, where a carrier frequency with a frequency spacing that is between the start carrier frequency and the carrier frequency and that is equal to the carrier or subcarrier frequency spacing multiplied by s is not a frequency of a first effective carrier. The effective carrier includes w first effective carriers and w second effective carriers that are in a one-to-one correspondence with each other. A frequency spacing between one first effective carrier and one second effective carrier that are in a one-to-one correspondence with each other is the paired carrier frequency spacing. Z>0, w>0, w>r>=0, and w>s>=0. In this method, a value of each bit is used to indicate whether a corresponding carrier is an effective carrier.

With reference to the first aspect and the second aspect, in a possible design, when the first information includes the first indication information, the effective carrier includes the start carrier. When the first information includes the second indication information or the third indication information, the effective carrier includes the start carrier and a carrier whose frequency spacing from the start carrier is the paired carrier frequency spacing.

With reference to the first aspect, in a possible design, the effective carrier further includes a third effective carrier, and the method further includes: performing blind detection on a plurality of carriers indicated by a preset carrier frequency set, to obtain a synchronization signal; and obtaining a frequency of the third effective carrier based on the synchronization signal, where the third effective carrier includes a carrier carrying the synchronization signal and a carrier carrying a physical broadcast channel (PBCH).

With reference to the first aspect, in a possible design, the method for obtaining the frequency of the third effective carrier based on the synchronization signal specifically includes: determining, based on a carrier frequency of the synchronization signal and a first preset value, a carrier frequency of the PBCH, where the first preset value is a location difference between the carrier frequency of the synchronization signal and the carrier frequency of the PBCH that are in the carrier frequency set.

With reference to the second aspect, in a possible design, the effective carrier further includes a third effective carrier, and the third effective carrier includes a carrier carrying a synchronization signal and a carrier carrying a PBCH. A location difference between a carrier frequency of the synchronization signal and a carrier frequency of the PBCH that are in a preset carrier frequency set is a first preset value.

With reference to the first aspect and the second aspect, in a possible design, when the first information includes the second indication information or the third indication information, the effective carrier further includes a fourth effective carrier, and a frequency spacing between a frequency of the fourth effective carrier and the carrier frequency of the synchronization signal is the paired carrier frequency spacing. The effective carrier further includes a fifth effective carrier, and a frequency spacing between a frequency of the fifth effective carrier and the carrier frequency of the PBCH is the paired carrier frequency spacing. In this method, the effective carrier further includes paired carriers carrying the synchronization signal, and paired carriers carrying the PBCH.

With reference to the first aspect and the second aspect, in a possible design, the effective carrier indication information further includes fourth information. The fourth information is used to indicate a frequency band location of the carrier of the synchronization signal. The frequency band location includes a high frequency band or a low frequency band. If the carrier of the synchronization signal is located in the high frequency band, the frequency of the fourth effective carrier is equal to the carrier frequency of the synchronization signal minus the paired carrier frequency spacing, and the frequency of the fifth effective carrier is equal to the carrier frequency of the PBCH minus the paired carrier frequency spacing. If the carrier of the synchronization signal is located in the low frequency band, the frequency of the fourth effective carrier is equal to the carrier frequency of the synchronization signal plus the paired carrier frequency spacing, and the frequency of the fifth effective carrier is equal to the carrier frequency of the PBCH plus the paired carrier frequency spacing.

With reference to the first aspect and the second aspect, in a possible design, the effective carrier indication information further includes fifth information. The fifth information is used to indicate a duplex mode, and the duplex mode includes time division duplex (TDD) or frequency division duplex (FDD).

With reference to the first aspect and the second aspect, in a possible design, when the duplex mode is the FDD, if the carrier of the synchronization signal is located in the high frequency band, a carrier that is of the effective carrier and that is located in the high frequency band is a downlink carrier, and a carrier that is of the effective carrier and that is located in the low frequency band is an uplink carrier; or if the carrier of the synchronization signal is located in the low frequency band, a carrier that is of the effective carrier and that is located in the low frequency band is a downlink carrier, and a carrier that is of the effective carrier and that is located in the high frequency band is an uplink carrier.

With reference to the first aspect and the second aspect, in a possible design, the effective carrier indication information is sent by using a system message or a broadcast message. The broadcast message may include a MIB and the like. The system message may include a SIB 1, a SIB 2, a SIB 3, a SIB 4, or the like.

According to a third aspect, this application provides a communications apparatus, and the apparatus can implement the communications method according to the first aspect. For example, the apparatus may be a terminal device or a chip used in a terminal device, or may be another apparatus that can implement the foregoing communications method. The apparatus may implement the foregoing method by using software, hardware, or hardware executing corresponding software.

In a possible design, the apparatus may include a processor and a memory. The processor is configured to support the apparatus in performing a corresponding function in the method according to the first aspect. The memory is configured to: be coupled to the processor, and store program instructions and data that are necessary for the apparatus. In addition, the apparatus may further include a communications interface, configured to support communication between the apparatus and another apparatus. The communications interface may be a transceiver or a transceiver circuit.

In a possible design, the apparatus may include a receiving unit and a processing unit. The receiving unit is configured to obtain effective carrier indication information from a network device. The processing unit is configured to obtain an effective carrier frequency based on the effective carrier indication information. The effective carrier indication information includes first information, second information, and third information. The first information includes first indication information, second indication information, or third indication information. The first indication information is used to indicate that carriers are not paired, the second indication information is used to indicate that carriers are paired, and the third indication information is used to indicate a paired carrier frequency spacing. The second information is used to indicate a start carrier frequency. The third information is used to indicate a frequency domain location of an effective carrier relative to a start carrier.

According to a fourth aspect, this application provides a communications apparatus, and the apparatus can implement the communications method according to the second aspect. For example, the apparatus may be a network device or a chip used in a network device, or may be another apparatus that can implement the foregoing communications method. The apparatus may implement the foregoing method by using software, hardware, or hardware executing corresponding software.

In a possible design, the apparatus may include a processor and a memory. The processor is configured to support the apparatus in performing a corresponding function in the method according to the second aspect. The memory is configured to: be coupled to the processor, and store program instructions and data that are necessary for the apparatus. In addition, the apparatus may further include a communications interface, configured to support communication between the apparatus and another apparatus. The communications interface may be a transceiver or a transceiver circuit.

In a possible design, the apparatus may include a processing unit and a sending unit. The processing unit is configured to determine effective carrier indication information. The effective carrier indication information is used by a terminal device to determine an effective carrier frequency. The sending unit is configured to send the effective carrier indication information to the terminal device. The effective carrier indication information includes first information, second information, and third information. The first information includes first indication information, second indication information, or third indication information. The first indication information is used to indicate that carriers are not paired, the second indication information is used to indicate that carriers are paired, and the third indication information is used to indicate a paired carrier frequency spacing. The second information is used to indicate a start carrier frequency. The third information is used to indicate a frequency domain location of an effective carrier relative to a start carrier.

With reference to the third aspect and the fourth aspect, in a possible design, the third information includes fourth indication information. When the first information includes the first indication information, the fourth indication information is used to indicate the effective carrier frequency. When the first information includes the second indication information or the third indication information, the fourth indication information is used to indicate a frequency of a first effective carrier, and the effective carrier includes w first effective carriers and w second effective carriers that are in a one-to-one correspondence with each other, where a frequency spacing between one first effective carrier and one second effective carrier that are in a one-to-one correspondence with each other is the paired carrier frequency spacing, and w>0.

With reference to the third aspect and the fourth aspect, in a possible design, the fourth indication information includes L bits, the L bits include q indication values, and the q indication values are used to indicate carrier frequencies of q or less than q effective carriers. An $i^{th}$ indication value is used to indicate that a frequency of an $i^{th}$ effective carrier is $(n_i+(t_i-1)\times(2^m-1))\times\Delta f+f_{i-1}$. The $i^{th}$ indication value includes $t_i \times m$ bits, where i=1, 2, ..., q, $1<=q<=L/m$, and $$L >= \sum_{i=1}^{q} t_i \times m > 0.$$

A value of $n_i$ is indicated by a $((t_i-1)\times m+1)^{th}$ bit to a $(t_i \times m)^{th}$ are of the indication value. $\Delta f$ is a carrier or subcarrier frequency spacing. When i>1, $f_{i-1}$ is an effective carrier frequency indicated by an $(i-1)^{th}$ indication value; or when i=1, $f_{i-1}$ is the start carrier frequency.

With reference to the third aspect and the fourth aspect, in a possible design, the third information includes fifth indication information, the fifth indication information includes Z bits, and each bit includes a first value or a second value. When the first information includes the second indication information or the third indication information, an $r^{th}$ bit is indicated by a first value, where a carrier frequency with a frequency spacing that is between the start carrier frequency and the carrier frequency and that is equal to a carrier or subcarrier frequency spacing multiplied by r is a frequency of a first effective carrier; and an $s^{th}$ bit is indicated by a second value, where a carrier frequency with a frequency spacing that is between the start carrier frequency and the carrier frequency and that is equal to the carrier or subcarrier frequency spacing multiplied by s is not a frequency of a first effective carrier. The effective carrier includes w first effective carriers and w second effective carriers that are in a one-to-one correspondence with each other. A frequency spacing between one first effective carrier and one second effective carrier that are in a one-to-one correspondence with each other is the paired carrier frequency spacing. $Z>0$, $w>0$, $w>r>=0$, and $w>s>=0$.

With reference to the third aspect and the fourth aspect, in a possible design, when the first information includes the first indication information, the effective carrier includes the start carrier. When the first information includes the second indication information or the third indication information, the effective carrier includes the start carrier and a carrier whose frequency spacing from the start carrier is the paired carrier frequency spacing.

With reference to the third aspect, in a possible design, the effective carrier further includes a third effective carrier. The processing unit is further configured to perform blind detection on a plurality of carriers indicated by a preset carrier frequency set, to obtain a synchronization signal. The processing unit is further configured to obtain a frequency of the third effective carrier based on the synchronization signal, where the third effective carrier includes a carrier carrying the synchronization signal and a carrier carrying a PBCH.

With reference to the third aspect, in a possible design, the processing unit is specifically configured to determine, based on a carrier frequency of the synchronization signal and a first preset value, a carrier frequency of the PBCH, where the first preset value is a location difference between the carrier frequency of the synchronization signal and the carrier frequency of the PBCH that are in the carrier frequency set.

With reference to the fourth aspect, in a possible design, the effective carrier further includes a third effective carrier, and the third effective carrier includes a carrier carrying a synchronization signal and a carrier carrying a PBCH. A location difference between a carrier frequency of the synchronization signal and a carrier frequency of the PBCH that are in a preset carrier frequency set is a first preset value.

With reference to the third aspect and the fourth aspect, in a possible design, when the first information includes the second indication information or the third indication information, the effective carrier further includes a fourth effective carrier, and a frequency spacing between a frequency of the fourth effective carrier and the carrier frequency of the synchronization signal is the paired carrier frequency spacing. The effective carrier further includes a fifth effective carrier, and a frequency spacing between a frequency of the fifth effective carrier and the carrier frequency of the PBCH is the paired carrier frequency spacing.

With reference to the third aspect and the fourth aspect, in a possible design, the effective carrier indication information further includes fourth information. The fourth information is used to indicate a frequency band location of the carrier of the synchronization signal. The frequency band location includes a high frequency band or a low frequency band. If the carrier of the synchronization signal is located in the high frequency band, the frequency of the fourth effective carrier is equal to the carrier frequency of the synchronization signal minus the paired carrier frequency spacing, and the frequency of the fifth effective carrier is equal to the carrier frequency of the PBCH minus the paired carrier frequency spacing. If the carrier of the synchronization signal is located in the low frequency band, the frequency of the fourth effective carrier is equal to the carrier frequency of the synchronization signal plus the paired carrier frequency spacing, and the frequency of the fifth effective carrier is equal to the carrier frequency of the PBCH plus the paired carrier frequency spacing.

With reference to the third aspect and the fourth aspect, in a possible design, the effective carrier indication information further includes fifth information. The fifth information is used to indicate a duplex mode, and the duplex mode includes TDD or FDD.

With reference to the third aspect and the fourth aspect, in a possible design, when the duplex mode is the FDD, if the carrier of the synchronization signal is located in the high frequency band, a carrier that is of the effective carrier and that is located in the high frequency band is a downlink carrier, and a carrier that is of the effective carrier and that is located in the low frequency band is an uplink carrier; or if the carrier of the synchronization signal is located in the low frequency band, a carrier that is of the effective carrier and that is located in the low frequency band is a downlink carrier, and a carrier that is of the effective carrier and that is located in the high frequency band is an uplink carrier.

With reference to the third aspect and the fourth aspect, in a possible design, the effective carrier indication information is sent by using a system message or a broadcast message. The broadcast message may include a MIB and the like. The system message may include a SIB 1, a SIB 2, a SIB 3, a SIB 4, or the like.

This application further provides a computer-readable storage medium. The computer-readable storage medium stores instructions. When the instructions are run on a computer, the computer is enabled to perform the method according to any one of the foregoing aspects.

This application further provides a computer program product including instructions. When the computer program product runs on a computer, the computer is enabled to perform the method according to any one of the foregoing aspects.

This application further provides a chip system. The chip system includes a processor, may further include a memory, and is configured to implement the method according to any one of the foregoing aspects.

This application provides a communications system, including the foregoing apparatus configured to implement the communications method according to the first aspect and the foregoing apparatus configured to implement the communications method according to the second aspect.

Any apparatus, computer storage medium, computer program product, chip system, or communications system provided above is configured to perform the corresponding method provided above. Therefore, for beneficial effects that can be achieved by the apparatus, computer storage medium, computer program product, chip system, or communications system provided above, refer to beneficial effects of a corresponding solution in the corresponding method provided above. Details are not described herein again.

DESCRIPTION OF EMBODIMENTS

The following describes in detail a communications method and apparatus provided in embodiments of this application with reference to the accompanying drawings.

Technical solutions provided in this application may be applied to various communications systems with a plurality of carriers, for example, a current 3G or 4G communications system, a 5G NR (new radio) system, a future evolved system, or a convergence system of a plurality of communications. There may be a plurality of application scenarios that may include scenarios such as machine to machine (M2M), D2M, macro-micro communication, enhanced mobile broadband (eMBB), ultra-reliable and low-latency communication (uRLLC), and massive machine-type communication (mMTC). The scenarios may include but are not limited to a scenario of communication between terminal devices, a scenario of communication between network devices, a scenario of communication between a network device and a terminal device, and the like.

Figure 1:
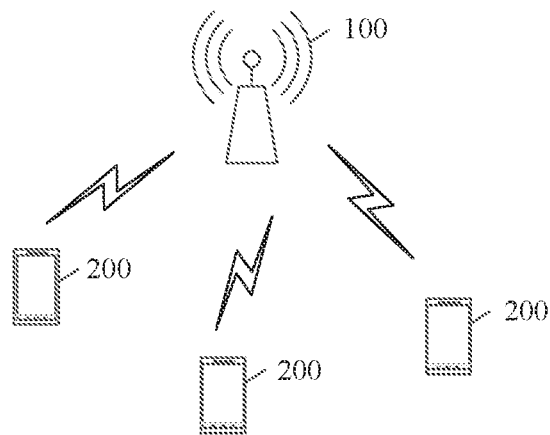
FIG. 1 is a schematic diagram 1 of a system architecture to which technical solutions according to an embodiment of this application are applicable.

The technical solutions provided in the embodiments of this application may be used in a system architecture shown in FIG. 1. The system architecture may include a network device 100 and one or more terminal devices 200 connected to the network device 100.

The network device 100 may be a device that can communicate with the terminal device 200. The network device 100 may be a relay station, an access point, or the like. The network device 100 may be a network device transceiver station (base transceiver station, BTS) in a global system for mobile communications (GSM) or a code division multiple access (CDMA) network, may be an NB (NodeB) in wideband code division multiple access (WCDMA), or may be an eNB or an eNodeB (evolutional NodeB) in LTE. Alternatively, the network device 100 may be a radio controller in a cloud radio access network (CRAN) scenario. Alternatively, the network device 100 may be a network device in a 5G network or a network device in a future evolved PLMN network, or may be a wearable device, a vehicle-mounted device, or the like.

The terminal device 200 may be an access terminal, a UE (user equipment) unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device or a computing device having a wireless communication function or another processing device connected to a wireless modem, a vehicle-mounted device, a wearable device, a terminal in a 5G network, a terminal in a future evolved PLMN network, or the like.

It should be noted that the system architecture shown in FIG. 1 is merely used as an example, but is not intended to limit the technical solutions in this application. A person skilled in the art should understand that in a specific implementation process, the system architecture may further include another device (for example, a core network). In addition, quantities of the network devices 100 and the terminal devices 200 may be configured based on a specific requirement.

The communications method and apparatus provided in the embodiments of this application may be used in user equipment. The user equipment includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, in the embodiments of this application, a specific structure of an execution body of the communications method is not particularly limited in the embodiments of this application, provided that a program that records code of the communications method in the embodiments of this application can be run to perform communication according to the communications method in the embodiments of this application. For example, the execution body of the communications method in the embodiments of this application may be user equipment, a function module that is in user equipment and that can invoke and execute the program, or an apparatus used in user equipment, for example, a chip. This is not limited in this application.

In addition, aspects or features in the embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable medium" may include but is not limited to a radio channel, and various other media that can store, contain, and/or carry instructions and/or data.

Figure 2:
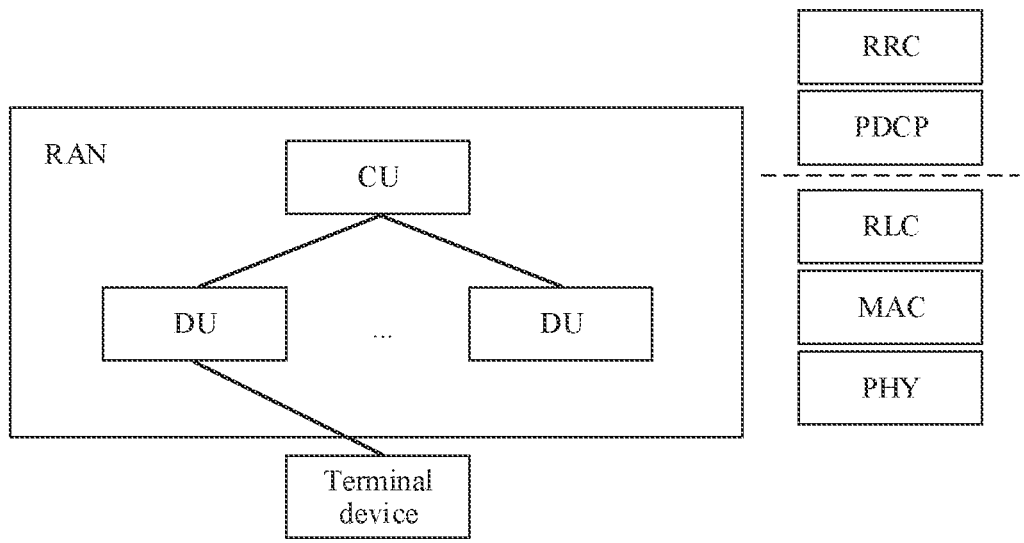
FIG. 2 is a schematic diagram 2 of a system architecture to which technical solutions according to an embodiment of this application are applicable.

A future access network may be implemented by using a cloud radio access network (C-RAN) architecture. Therefore, in a possible manner, a protocol stack architecture and a function of a conventional base station are divided into two parts. One part is referred to as a centralized unit (CU), and the other part is referred to as a distributed unit (DU). An actual deployment manner of the CU and the DU is relatively flexible. For example, CUs of a plurality of base stations are integrated to form a functional entity with a relatively large scale. FIG. 2 is a schematic diagram of a network architecture according to an embodiment of this application. As shown in FIG. 2, the network architecture includes an access network (where a radio access network (RAN) is used as an example) device and a terminal device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in an LTE communications system, a RAN device (eNB) includes a baseband apparatus and a radio frequency apparatus. The radio frequency apparatus may be remotely arranged relative to the baseband apparatus (for example, a radio remote unit (RRU) is remotely arranged relative to a building baseband unit (BBU)). The RAN device is implemented by one node, and the node is configured to implement functions of protocol layers such as a radio resource control (RRC) layer, a packet data convergence protocol (PDCP) layer, a radio link control (RLC) layer, and a media access control (MAC) layer. For another example, in an evolved structure, a baseband apparatus may include a centralized unit (CU) and a distributed unit (DU), and a plurality of DUs may be centrally controlled by one CU. As shown in FIG. 2, division may be performed for the CU and the DU based on a protocol layer of a wireless network. For example, functions of a packet data convergence protocol layer and a protocol layer above the packet data convergence protocol layer are set on the CU, and functions of protocol layers below the PDCP layer, for example, a radio link control (RLC) layer and a media access control layer, are set on the DU.

The division based on the protocol layer is merely an example, and division may alternatively be performed at another protocol layer, for example, the RLC layer. Functions of the RLC layer and a protocol layer above the RLC layer are set on the CU, and a function of a protocol layer below the RLC layer are set on the DU. Alternatively, division is performed at a protocol layer, for example, a part of a function of the RLC layer and a function of a protocol layer above the RLC layer are set on the CU, and a remaining function of the RLC layer and a function of a protocol layer below the RLC layer are set on the DU. In addition, division may alternatively be performed in another manner. For example, the division is performed based on a latency. A function whose processing time needs to satisfy a latency requirement is set on the DU, and a function whose processing time does not need to satisfy the latency requirement is set on the CU.

In addition, the radio frequency apparatus may be not placed in the DU but is placed remotely from the DU, or may be integrated into the DU, or a part is placed remotely from the DU and a remaining part is integrated into the DU. This is not limited herein.

Figure 3:
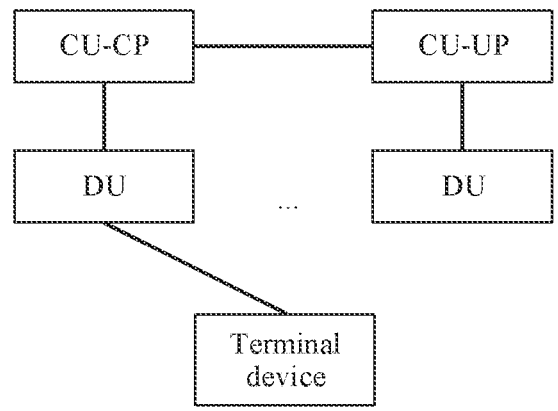
FIG. 3 is a schematic diagram 3 of a system architecture to which technical solutions according to an embodiment of this application are applicable.

In addition, still refer to FIG. 3. Compared with the architecture shown in FIG. 2, a control plane (CP) and a user plane (UP) of the CU may be further separated and implemented by dividing the CU into different entities. The entities are separately a CU control plane entity (CU-CP entity) and a CU user plane entity (CU-UP entity).

In the foregoing network architecture, signaling/data generated by the CU may be sent to a terminal device by using the DU, or signaling/data generated by a terminal device may be sent to the CU by using the DU. The DU may not parse the signaling/data, but directly encapsulate the signaling/data by using a protocol layer and transparently transmits the signaling/data to the terminal device or the CU. In the following embodiments, if the transmission of signaling/data between a DU and a terminal device is described, sending or receiving the signaling/data by the DU is applicable to the scenario. For example, signaling of an RRC or a PDCP layer is finally processed as signaling/data of a physical layer (PHY) and sent to the terminal device, or is converted from received signaling/data of a PRY layer. In this architecture, it may also be considered that the signaling/data of the RRC layer or the PDCP layer is sent by the DU, or is sent by the DU and a radio frequency.

In the foregoing embodiment, the CU is classified as a network device in a RAN. In addition, the CU may alternatively be classified as a network device in a core network. This is not limited herein.

The apparatus in the following embodiments of this application may be located in a terminal device or a network device based on a function implemented by the apparatus. When the foregoing CU-DU structure is used, the network device may be a CU node, a DU node, or a RAN device including functions of a CU node and a DU node.

In this application, the foregoing communications method may be performed by the network device and the terminal device, or may be performed by an apparatus used in the network device and the terminal device, for example, a chip, or another apparatus for implementing the foregoing communications method. This is not limited in the embodiments of this application. In this specification, an example in which the foregoing communications method is performed by the network device and the terminal device is used for description.

The following explains and describes some terms used in this application.

1. Effective Carrier:

The network device and the terminal device may perform wireless communication by using an air interface resource. The air interface resource may include a time domain resource and a frequency domain resource that may also be referred to as a time-frequency resource. A bandwidth of the frequency domain resource may be divided into a plurality of carriers. In different application scenarios (for example, in different countries), a carrier that is in the plurality of carriers and that may be used to transmit signaling or data is an effective carrier.

2. Carrier or Subcarrier Frequency Spacing:

The carrier or subcarrier frequency spacing is a preset carrier frequency spacing value $\Delta f$, and a frequency spacing between center frequencies of any two effective carriers is an integer multiple of the carrier or subcarrier frequency spacing. For example, for any two effective carriers, there is a positive integer h, so that a frequency spacing f between center frequencies of the two effective carriers satisfies $f=h \times \Delta f$. For example, the carrier or subcarrier frequency spacing may be 25 kHz or 12.5 kHz. In this application, a center frequency of a carrier is also referred to as a carrier frequency.

3. The term "a plurality of" in this specification means two or more. The terms "first" and "second" in this specification are intended to distinguish between different objects, but are intended to indicate a particular order of the objects. For example, a first effective carrier and a second effective carrier are used to indicate different effective carriers, but are not used to describe a sequence of the effective carriers. The term "and/or" in this specification describes only an association relationship between associated objects and represents that there may be three relationships. For example. A and/or B may represent the following three cases: Only A exists, both A and B exist, and only B exists.

In the embodiments of this application, the word such as "example" or "for example" is used to give an example, an illustration, or a description. Any embodiment or design scheme described as an "example" or with "for example" in the embodiments of this application should not be explained as being more preferred or having more advantages than another embodiment or design scheme. More specifically, use of the word such as "example" or "for example" is intended to present a relative concept in a specific manner.

Figure 4:
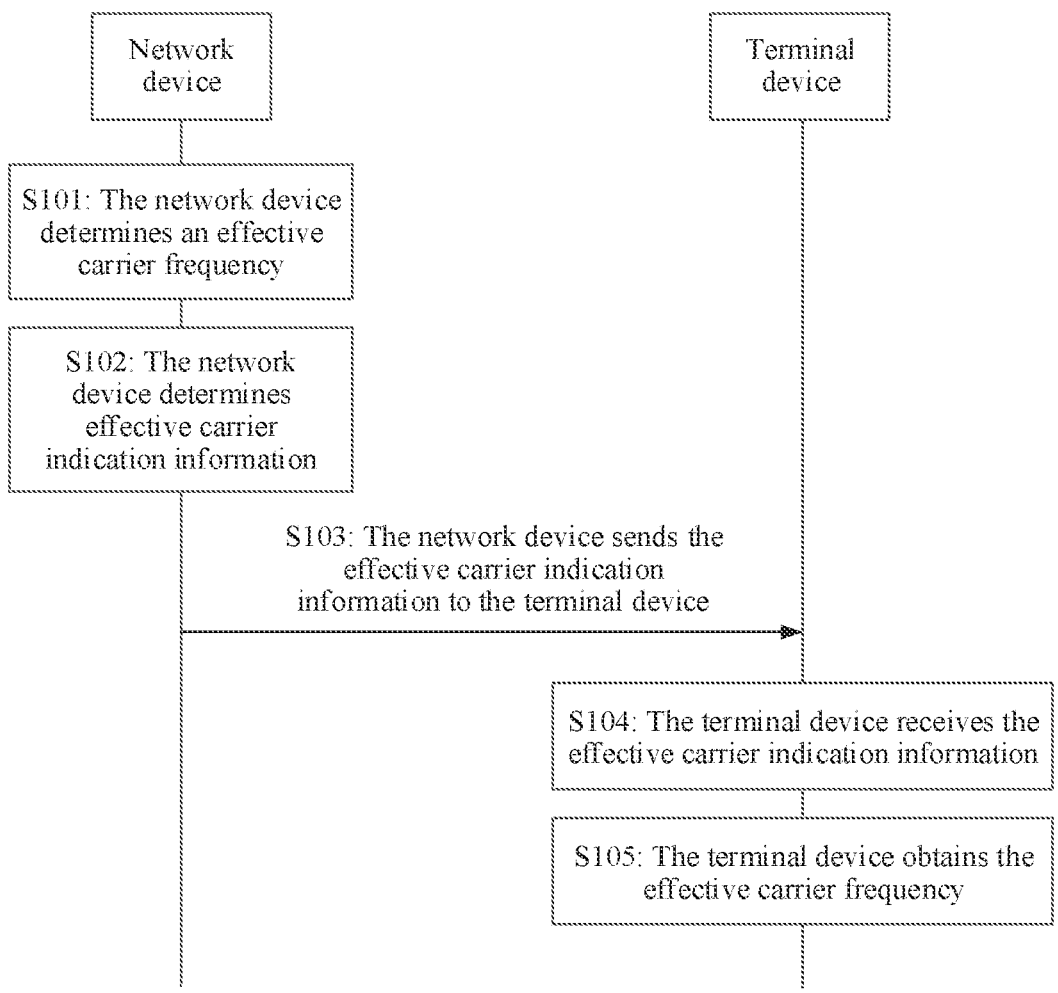
FIG. 4 is a schematic diagram of a communications method according to an embodiment of this application.

An embodiment of this application provides a communications method. The method may be used in the communications systems shown in FIG. 1 to FIG. 3. As shown in FIG. 4, the method may include S101 to S105.

S101: A network device determines an effective carrier frequency.

For example, the network device may determine the effective carrier frequency based on network planning. For example, an available carrier frequency of a wireless network deployed inside a country is an effective carrier frequency. For example, a carrier frequency that is in available carrier frequencies and that is determined based on a network optimization parameter is an effective carrier frequency. An effective carrier frequency range is not limited in this embodiment of this application.

Optionally, an effective carrier may be a paired carrier or an unpaired carrier.

Figure 5:
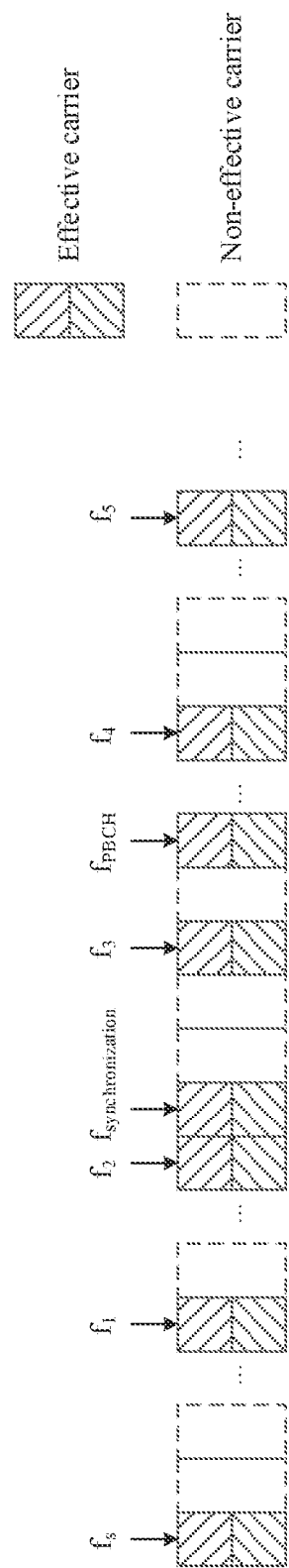
FIG. 5 is a schematic diagram 1 of effective carrier distribution according to an embodiment of this application.

For example, as shown in FIG. 5, effective carriers are unpaired carriers, and $f_s$, $f_1$, $f_2$, $f_3$, $f_4$, and $f_5$ are frequencies of the effective carriers. Optionally, an effective carrier further includes a carrier (whose carrier frequency is $f_{synchronization}$) carrying a synchronization signal and a carrier (whose carrier frequency is $f_{PBCH}$) carrying a physical broadcast channel (PBCH).

For example, as shown in FIG. 6A, FIG. 6B, FIG. 7A, or FIG. 7B, effective carriers are paired carriers. Every two carriers in the effective carriers are in a one-to-one correspondence, and a frequency spacing between the two effective carriers in a one-to-one correspondence is referred to as a paired carrier frequency spacing $f_d$. For example, the effective carrier includes w first effective carriers and w second effective carriers that are in a one-to-one correspondence with each other. A frequency spacing between one first effective carrier and one second effective carrier that are in a one-to-one correspondence with each other is the paired carrier frequency spacing $f_d$, and w>0. For example, in FIG. 6A, FIG. 6B, FIG. 7A, or FIG. 7B, the first effective carrier includes carriers whose carrier frequencies are respectively $f_s$, $f_1$, $f_2$, $f_3$, $f_4$, and $f_5$. The second effective carrier includes carriers whose carrier frequencies are respectively $f_s+f_d$, $f_1+f_d$, $f_2+f_d$, $f_3+f_d$, $f_4+f_d$ and $f_5+f_d$. The carrier whose carrier frequency is $f_s$ is paired with the carrier whose carrier frequency is $f_s+f_d$. The carrier whose carrier frequency is $f_1$ is paired with the carrier whose carrier frequency is $f_1+f_d$. The carrier whose carrier frequency is $f_2$ is paired with the carrier whose carrier frequency is $f_2+f_d$. The carrier whose carrier frequency is $f_3$ is paired with the carrier whose carrier frequency is $f_3+f_d$. The carrier whose carrier frequency is $f_4$ is paired with the carrier whose carrier frequency is $f_4+f_d$. The carrier whose carrier frequency is $f_5$ is paired with the carrier whose carrier frequency is $f_5+f_d$. In an optional implementation, the effective carrier further includes a third effective carrier, and the third effective carrier includes the carrier (whose carrier frequency is $f_{synchronization}$) carrying the synchronization signal and the carrier (whose carrier frequency is $f_{PBCH}$) carrying the PBCH. In an optional implementation, the effective carrier further includes a fourth effective carrier, and a frequency spacing between a frequency of the fourth effective carrier and the carrier frequency ($f_{synchronization}$) of the synchronization signal is $f_d$. The effective carrier further includes a fifth effective carrier, and a frequency spacing between a frequency of the fifth effective carrier and the carrier frequency ($f_{PBCH}$) of the PBCH is $f_d$. For example, $f_s$ ranges from 0 MHz to 819.2 MHz, and $f_d$ ranges from 5 MHz to 20 MHz.

Figure 6A:
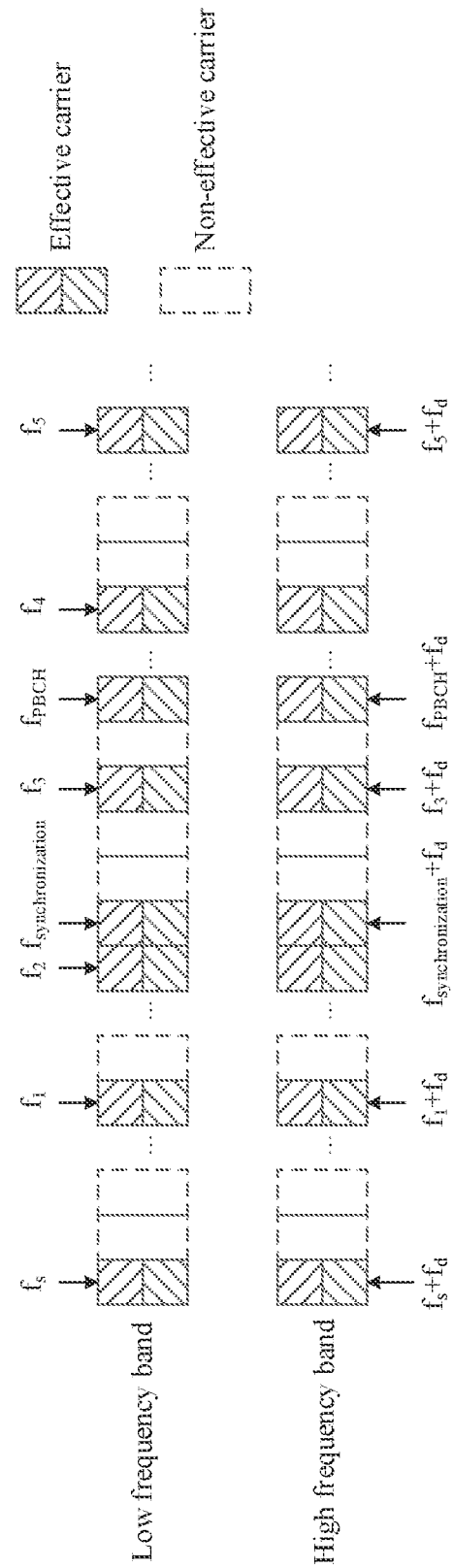
FIG. 6A is a schematic diagram 2 of effective carrier distribution according to an embodiment of this application.
Figure 6B:
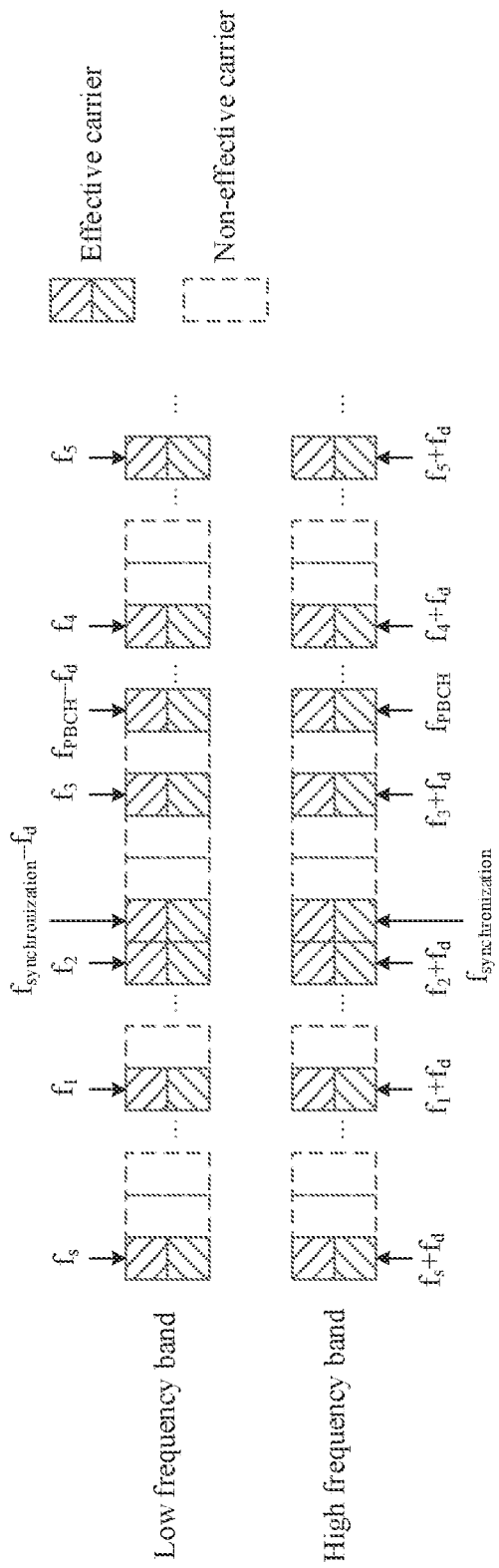
FIG. 6B is a schematic diagram 3 of effective carrier distribution according to an embodiment of this application.
Figure 7A:
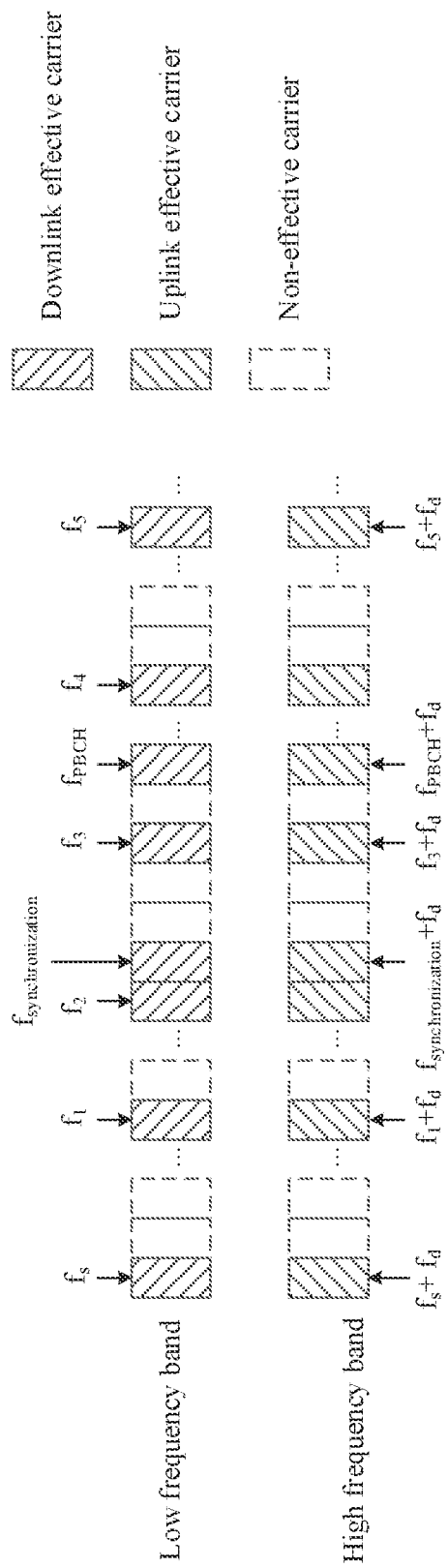
FIG. 7A is a schematic diagram 4 of effective carrier distribution according to an embodiment of this application.
Figure 7B:
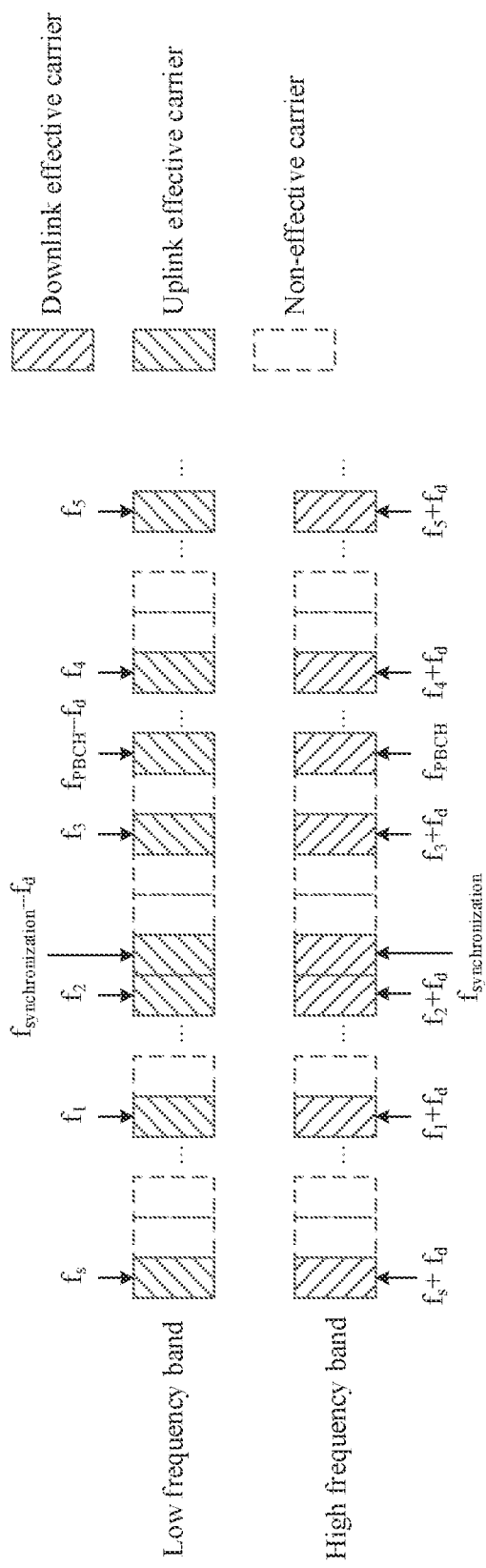
FIG. 7B is a schematic diagram 5 of effective carrier distribution according to an embodiment of this application.

Optionally, if effective carriers are paired carriers, the carrier of the synchronization signal may be located in a low frequency band or a high frequency band. For example, as shown in FIG. 6A or FIG. 7A, the carrier of the synchronization signal is located in a low frequency band. In this case, the frequency of the fourth effective carrier is equal to $f_{synchronization}$ plus $f_d$, and the frequency of the fifth effective carrier is equal to $f_{PBCH}$ plus $f_d$. For example, as shown in FIG. 6B or FIG. 7B, the carrier of the synchronization signal is located in a high frequency band. In this case, the frequency of the fourth effective carrier is equal to $f_{synchronization}$ minus $f_d$, and the frequency of the fifth effective carrier is equal to $f_{PBCH}$ minus $f_d$.

Optionally, if effective carriers are paired carriers, a duplex mode may include time division duplex (TDD) or frequency division duplex (FDD). For example, as shown in FIG. 6A and FIG. 6B, the duplex mode is the TDD, and the effective carriers are bidirectional effective carriers. The bidirectional effective carriers may be used for uplink transmission, or may be used for downlink transmission. As shown in FIG. 7A and FIG. 7B, the duplex mode is the FDD. One effective carrier in a pair of effective carriers is a downlink effective carrier, and the downlink effective carrier is used for downlink transmission. The other effective carrier is an uplink effective carrier, and the uplink effective carrier is used for uplink transmission. In a possible implementation, as shown in FIG. 7A, the carrier of the synchronization signal is located in a low frequency band, a carrier that is of the effective carrier and that is located in the low frequency band is a downlink carrier, and a carrier that is of the effective carrier and that is located in a high frequency band is an uplink carrier. In a possible implementation, as shown in FIG. 7B, the carrier of the synchronization signal is located in a high frequency band, a carrier that is of the effective carrier and that is located in the high frequency band is a downlink carrier, and a carrier that is of the effective carrier and that is located in a low frequency band is an uplink carrier.

S102: The network device determines effective carrier indication information.

The network device determines the effective carrier indication information based on an effective carrier frequency, where the effective carrier indication information is used by a terminal device to determine the effective carrier frequency.

In an implementation, the effective carrier indication information includes first information, second information, and third information.

In an implementation, the first information includes first indication information, second indication information, or third indication information. The first indication information is used to indicate that carriers are not paired, the second indication information is used to indicate that carriers are paired, and the third indication information is used to indicate a paired carrier frequency spacing.

For example, the first indication information and the second indication information are represented by using one bit. For example, when a value of the bit is 0, it is indicated that carriers are not paired; or when a value of the bit is 1, it is indicated that carriers are paired. For example, the third indication information is represented by using three bits. For example, optional values of the paired carrier frequency spacing include {MHz5, MHz7, MHz8, MHz10, MHz12, MHz15 and MHz20}, and values of the third indication information that respectively correspond to the optional values of the paired carrier frequency spacing are {001, 010, 011, 100, 101, 110, 111}. For example, when a value of the third indication information is 001B, it is indicated that an optional value of the paired carrier frequency spacing is MHz5 that indicates 5 MHz; or when a value of the third indication information is 101B, it is indicated that an optional value of the paired carrier frequency spacing is MHz12 that indicates 12 MHz.

For example, the first indication information, the second indication information, and the third indication information are represented by using three bits. The second indication information and the third indication information may be same indication information. When values of the three bits are 0 (that is, 000B), the three bits are the first indication information, and it is indicated that carriers are not paired. When not all values of the three bits are 0 (for example, 101B), the three bits are the second indication information and the third indication information, it is indicated that carriers are paired, and the values of the three bits indicate a paired carrier frequency spacing. For example, optional values of the paired carrier frequency spacing include {0, MHz5, MHz7, MHz8, MHz10, MHz12, MHz15 and MHz20}, and binary code streams that respectively correspond to the optional values of the paired carrier frequency spacing are {000, 001, 010, 011, 100, 101, 110, 111}. For example, 000 indicates that carriers are not paired; and 101 indicates that carriers are paired, and an optional value of the paired carrier frequency spacing is MHz12 that indicates 12 MHz.

In an implementation, the second information is used to indicate a start carrier frequency. For example, the second information is represented by using 16 bits. For example, the second information is 1000000000000000B, and it is indicated that the start carrier frequency is: 32768×Carrier or subcarrier frequency spacing=32768×12.5 kHz=409.6 MHz.

In an implementation, the third information is used to indicate a frequency domain location of the effective carrier relative to a start carrier.

Manner 1:

The third information includes fourth indication information.

If an effective carrier is an unpaired carrier (that is, the first information includes the first indication information), the fourth indication information is used to indicate an effective carrier frequency. If effective carriers are paired carriers (that is, the first information includes the second indication information or the third indication information), the fourth indication information is used to indicate a frequency of a first effective carrier.

In an implementation, the fourth indication information includes L bits, the L bits include q indication values, and the q indication values are used to indicate carrier frequencies of q or less than q effective carriers.

An $i^{th}$ indication value is used to indicate that a frequency of an $i^{th}$ effective carrier is $(n_i+(t_i-1)\times(2^m-1))\times\Delta f+f_{i-1}$. The indication value includes $t_i\times m$ bits, where $i=1, 2, \ldots, q$, $1<=q<=L/m$, $$L >= \sum_{i=1}^{q} t_i \times m > 0,$$

a value of $n_i$ is indicated by a $((t_i-1)\times m+1)^{th}$ bit to a $(t_i\times m)^{th}$ bit that are of the $i^{th}$ indication value, and $\Delta f$ is a carrier or subcarrier frequency spacing. When i>1, $f_{i-1}$ is an effective carrier frequency indicated by an $(i-1)^{th}$ indication value; or when i=1, $f_{i-1}$ is the start carrier frequency, where $f_0$ is $f_s$.

For example, L=160, that is, the fourth indication information includes 160 bits.

Figure 8A:
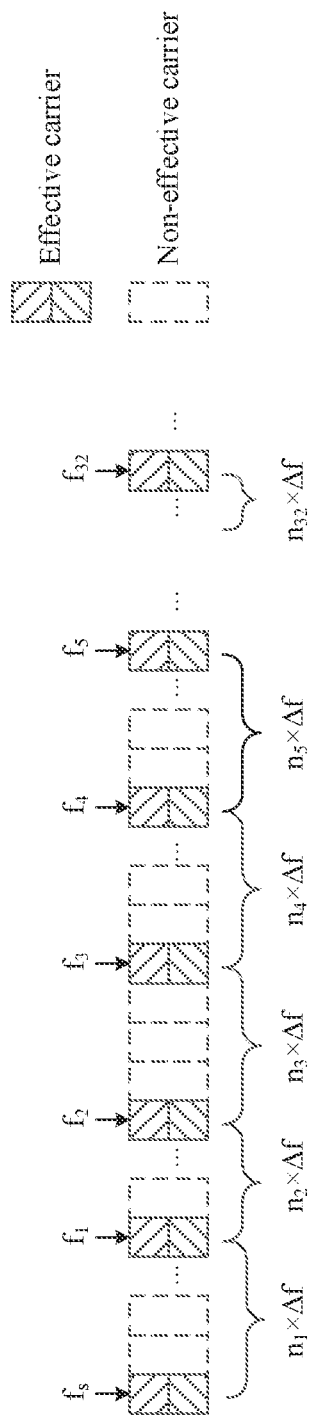
FIG. 8A is a schematic diagram 1 of an effective carrier indication method according to an embodiment of this application.
Figure 8B:
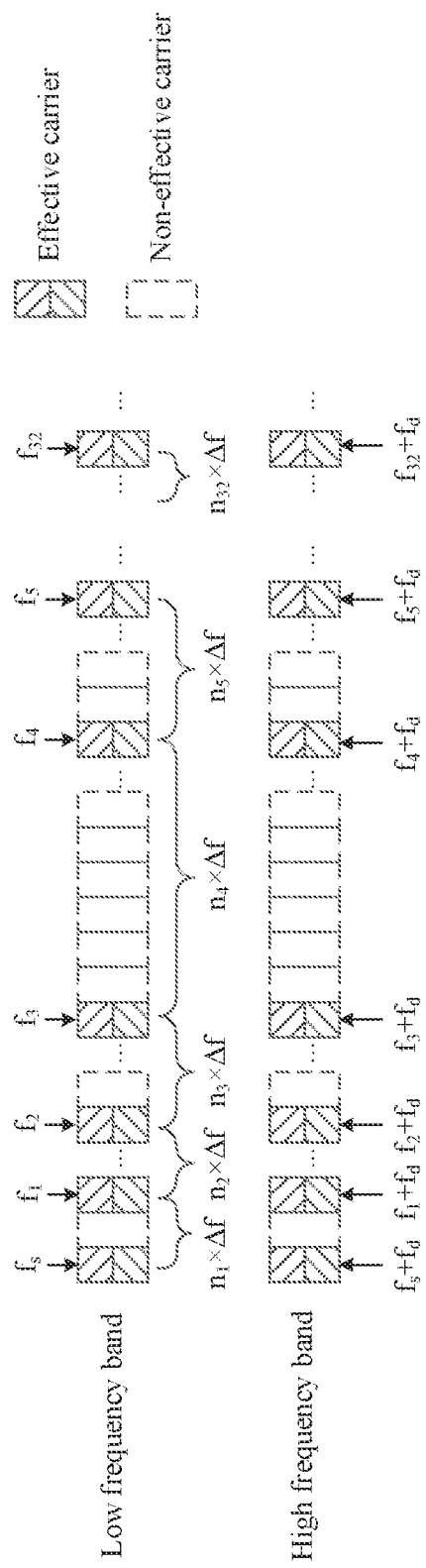
FIG. 8B is a schematic diagram 2 of an effective carrier indication method according to an embodiment of this application.

In an implementation, the fourth indication information includes q indication values, each indication value includes m bits ($t_i$=1), and q=L/m. For example, q=32, and m=5. The $i^{th}$ indication value is used to indicate that the frequency of the $i^{th}$ effective carrier is $n_i \times \Delta f + f_{i-1}$, where $n_i$ is the $i^{th}$ indication value, and $0 < n_i <= (2^m - 1)$. For example, as shown in FIG. 8A or FIG. 8B, $f_1 = f_s + n_1 \times \Delta f$; $f_2 = f_1 + n_2 \times \Delta f$; $f_3 = f_2 + n_3 \times \Delta f$, $f_4 = f_3 + n_4 \times \Delta f$; $f_5 = f_4 + n_5 \times \Delta f$; . . . ; and $f_q = f_{q-1} + n_q \times \Delta f$.

Optionally, the q indication values are used to indicate the carrier frequencies of the q effective carriers. For example, as shown in FIG. 8A, effective carriers are unpaired carriers. 32 indication values indicate 32 effective carriers, and carrier frequencies are respectively $f_1$, $f_2$, $f_3$, $f_4$, $f_5$, . . . , and $f_{32}$. As shown in FIG. 8B, effective carriers are paired carriers. 32 indication values indicate 32 first effective carriers, and carrier frequencies are respectively $f_1$, $f_2$, $f_3$, $f_4$, $f_5$, . . . , and $f_{32}$. Correspondingly, 32 second effective carriers can be obtained, and carrier frequencies are respectively $f_1+f_d$, $f_2+f_d$, $f_3+f_d$, $f_4+f_d$, $f_5+f_d$, . . . , and $f_{32}+f_d$.

For example, the indication values are shown in Table 1.

TABLE 1

| i | $n_i$ | $i^{th}$ indication value |
|---|---|---|
| 1 | $n_1$ | 00011B |
| 2 | $n_2$ | 01011B |
| 3 | $n_3$ | 11001B |
| 4 | $n_4$ | 10010B |
| 5 | $n_5$ | 01110B |
| . . . | . . . | . . . |
| q | $n_q$ | 11100B |

Figure 8C:
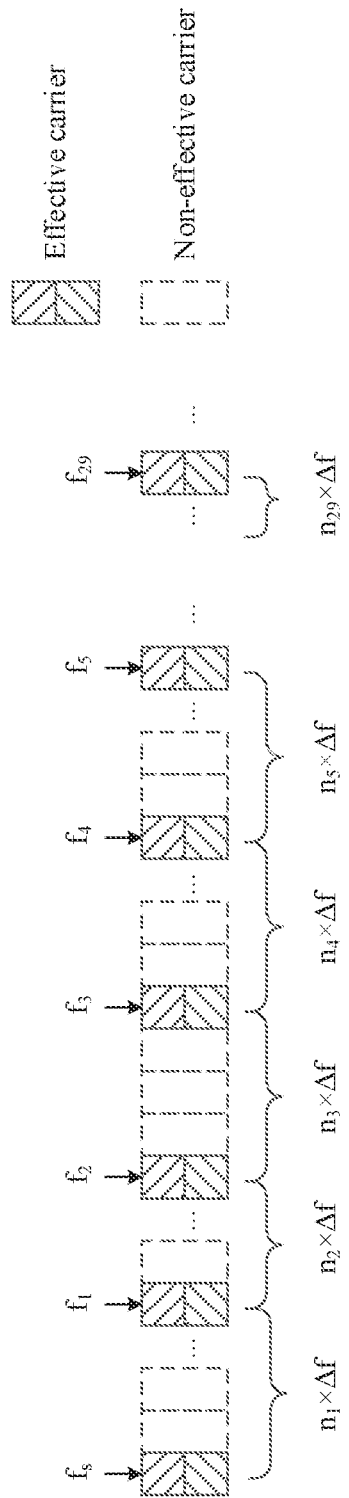
FIG. 8C is a schematic diagram 3 of an effective carrier indication method according to an embodiment of this application.

Optionally, the q indication values are used to indicate the carrier frequencies of the less than q effective carriers. For example, as shown in FIG. 8C, effective carriers are unpaired carriers. 32 indication values indicate 29 effective carriers, and carrier frequencies are respectively $f_1$, $f_2$, $f_3$, $f_4$, $f_5$, . . . , and $f_{29}$.

For example, the indication values are shown in Table 2. A value of $n_i$ is greater than 0, and is used to indicate an effective carrier; or a value of $n_i$ is equal to 0, and is not used to indicate an effective carrier.

TABLE 2

| i | $n_i$ | $i^{th}$ indication value |
|---|---|---|
| 1 | $n_1$ | 00011B |
| 2 | $n_2$ | 01011B |
| 3 | $n_3$ | 11001B |
| 4 | $n_4$ | 10010B |
| 5 | $n_5$ | 01110B |
| . . . | . . . | . . . |
| 29 | $n_{29}$ | 11100B |
| 30 | $n_{30}$ | 00000B |
| 31 | $n_{31}$ | 00000B |
| 32 | $n_{32}$ | 00000B |

In an implementation, the fourth indication information includes q indication values, the $i^{th}$ indication value includes $t_i \times m$ bits, and q<L/m. For example, q=29, and m=5. That is, the $i^{th}$ indication value may include $t_i \times 5$ bits. The indication value is used to indicate that the frequency of the $i^{th}$ effective carrier is $(n_i + (t_i - 1) \times (2^m - 1)) \times \Delta f + f_{i-1}$, where the value of $n_i$ is indicated by the) $((t_i - 1) \times m + 1)^{th}$ bit to the $(t_i \times m)^{th}$ bit that are of the $i^{th}$ indication value, and $0 < n_i <= (2^m - 1)$. For example, $t_i$ is 1, and the $i^{th}$ indication value includes five bits. Alternatively, for example, $t_i$ is 3, and the $i^{th}$ indication value includes 3×5=15 bits. For example, $t_4$ is 3, and the fourth indication value includes 15 bits. $t_{29}$ is 2, and the $29^{th}$ indication value includes 2×5=10 bits. Another indication value includes five bits. For example, the indication values are shown in Table 3.

TABLE 3

| i | $n_i$ | $i^{th}$ indication value |
|---|---|---|
| 1 | $n_1$ | 00011B |
| 2 | $n_2$ | 01011B |
| 3 | $n_3$ | 11001B |
| 4 |  | 00000 |
|   |  | 00000 |
|   | $n_4$ | 10010B |
| 5 | $n_5$ | 01110B |
| . . . | . . . | . . . |
| 29 |  | 00000 |
|   | $n_{29}$ | 11100B |

For example, $f_4 = f_3 + (n_4 + 2 \times (2^5 - 1)) \times \Delta f$. A value of $n_4$ is a value (10010B) indicated by the $11^{th}$ bit to the $15^{th}$ bit that are of the fourth indication value. $f_{29} = f_{28} + (n_{29} + (2^5 - 1)) \times \Delta f$. A value of $n_{29}$ is a value (11100B) indicated by the sixth bit to the $10^{th}$ bit that are of the $29^{th}$ indication value.

Figure 8D:
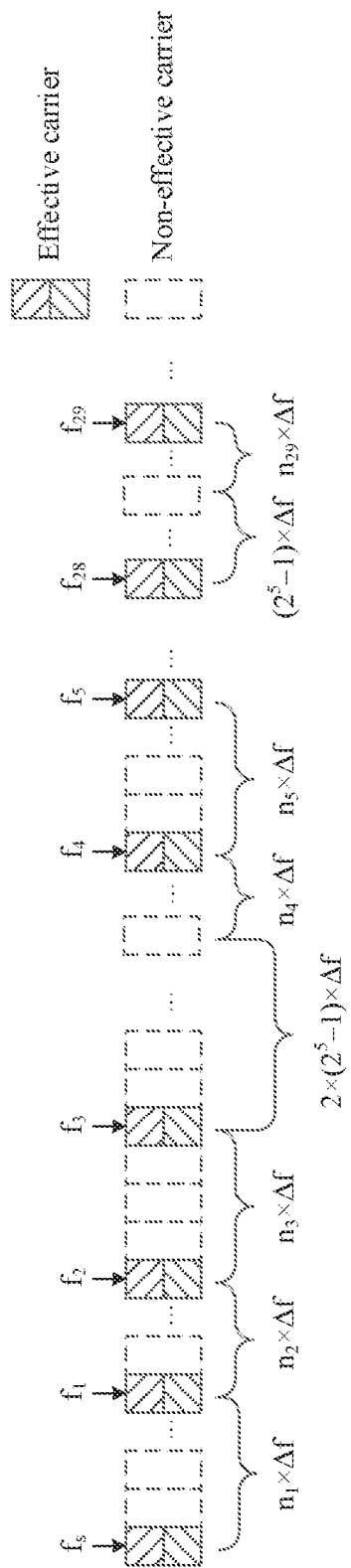
FIG. 8D is a schematic diagram 4 of an effective carrier indication method according to an embodiment of this application.

For example, as shown in FIG. 8D, $f_1 = f_s + n_1 \times \Delta f$; $f_2 = f_1 + n_2 \times \Delta f$; $f_3 = f_2 + n_3 \times \Delta f$; $f_4 = f_3 + (n_4 + 2 \times (2^5 - 1)) \times \Delta f$; $f_5 = f_4 + n_5 \times \Delta f$; . . . ; and $f_{29} = f_{28} + (n_{29} + (2^5 - 1)) \times \Delta f$.

Manner 2:

The third information includes fifth indication information. The fifth indication information includes Z bits, Z>0, and each bit includes a first value or a second value. For example, when the first value is 1, it is indicated. that a corresponding carrier frequency is an effective carrier frequency; or when the second value is 0, it is indicated that a corresponding carrier frequency is not an effective carrier frequency.

Figure 9A:
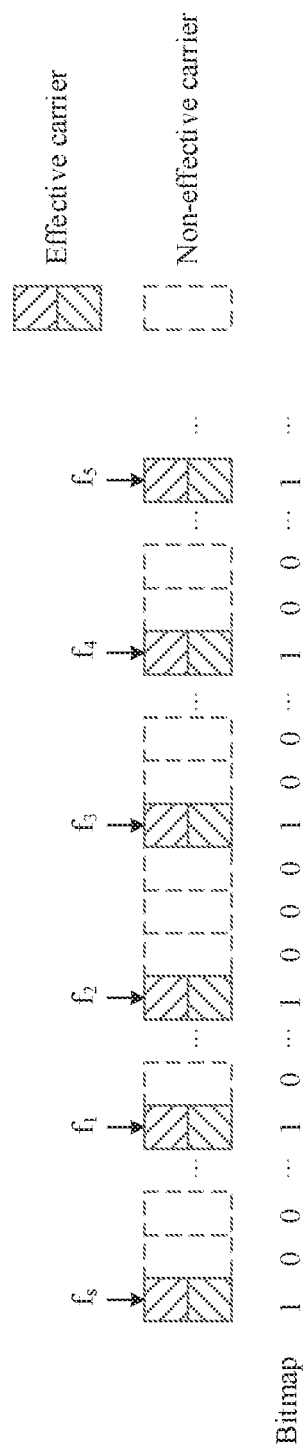
FIG. 9A is a schematic diagram 1 of another effective carrier indication method according to an embodiment of this application.
Figure 9B:
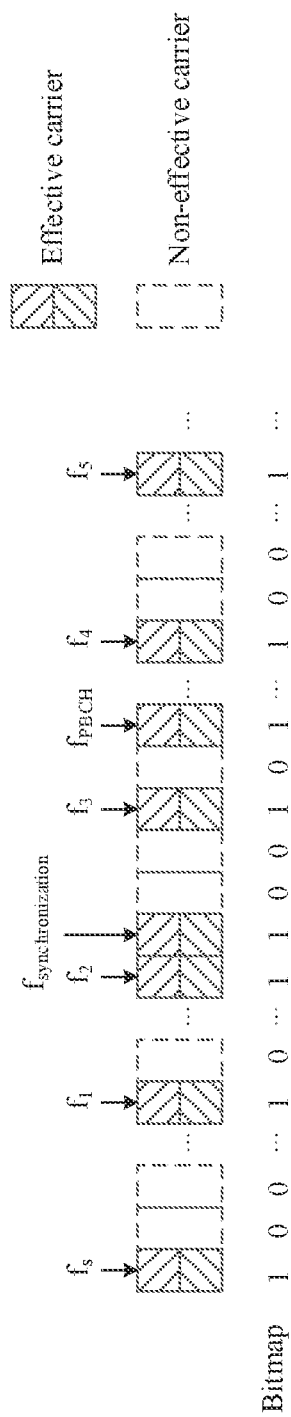
FIG. 9B is a schematic diagram 2 of another effective carrier indication method according to an embodiment of this application.

If an effective carrier is an unpaired carrier (that is, the first information includes the first indication information), for example, the fifth indication information is shown in FIG. 9A. Alternatively, an effective carrier indicated by the fifth indication information may further include a carrier of a synchronization signal and a carrier of a PBCH. For example, the fifth indication information is shown in FIG. 9B.

Figure 9C:
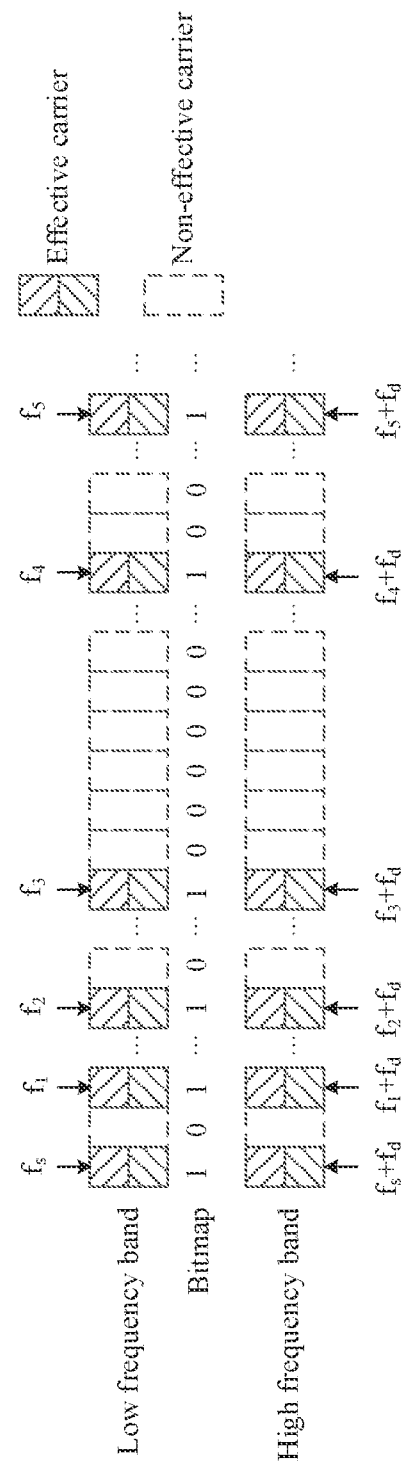
FIG. 9C is a schematic diagram 3 of another effective carrier indication method according to an embodiment of this application.

If effective carriers are paired carriers (that is, the first information includes the second indication information or the third indication information), an $r^{th}$ bit is indicated by a first value, where a carrier frequency with a frequency spacing that is between a start carrier frequency and the carrier frequency and that is equal to a carrier or subcarrier frequency spacing multiplied by r is a frequency of a first effective carrier; an $s^{th}$ bit is indicated by a second value, where a carrier frequency with a frequency spacing that is between the start carrier frequency and the carrier frequency and that is equal to the carrier or subcarrier frequency spacing multiplied by s is not a frequency of a first effective carrier; and w>r>=0, and w>s>=0. For example, the fifth indication information is shown in FIG. 9C. When the $0^{th}$ bit is 1, it is indicated that the start carrier is the first effective carrier; when the first bit is 0, it is indicated that a carrier frequency with a frequency spacing that is between the start carrier frequency and the carrier frequency and that is equal to the carrier or subcarrier frequency spacing is not a frequency of a first effective carrier; and when the second bit is 0, it is indicated that a carrier frequency with a frequency spacing that is between the start carrier frequency and the carrier frequency and that is equal to the carrier or subcarrier frequency spacing multiplied by 2 is a frequency of a first effective carrier. It may be determined, based on the fifth indication information, that frequencies of first effective carriers are respectively $f_s$, $f_1$, $f_2$, $f_3$, $f_4$, and $f_5$. Further, it may be determined, based on the frequencies of first effective carriers and $f_d$, that the second effective carrier includes carriers whose carrier frequencies are respectively $f_s+f_d$, $f_1+f_d$, $f_2+f_d$, $f_3+f_d$, $f_4+f_d$, and $f_5+f_d$.

It should be noted that an example in which a start carrier is an effective carrier is used for description in this embodiment of this application. In actual application, a start carrier may alternatively be a non-effective carrier. A case in which a start carrier is a non-effective carrier is not described in this embodiment of this application. This is not limited in this embodiment of this application.

In an implementation, the effective carrier indication information further includes fourth information, and the fourth information is used to indicate a frequency band location of the carrier of the synchronization signal. The frequency band location may include a high frequency band or a low frequency band. For example, that a value of the fourth information is 1 indicates the high frequency band, and that a value of the fourth information is 0 indicates the low frequency band. For example, that a value of the fourth information is 1 indicates the low frequency band, and that a value of the fourth information is 0 indicates the high frequency band.

In an implementation, the effective carrier indication information further includes fifth information, and the fifth information is used to indicate a duplex mode. For example, that a value of the fifth information is 1 indicates TDD, and that a value of the fifth information is 0 indicates FDD. For example, that a value of the fifth information is 1 indicates FDD, and that a value of the fifth information is 0 indicates TDD.

It should be noted that the foregoing embodiment is merely an example description of an implementation of the effective carrier indication information, and the effective carrier indication information may alternatively be in another form. This is not limited in this embodiment of this application.

S103: The network device sends the effective carrier indication information to a terminal device.

The network device may send a system message to the terminal device, where the system message includes the effective carrier indication information. Alternatively, the network device may send a broadcast message to the terminal device, where the broadcast message includes the effective carrier indication information. A type of a message for sending the effective carrier indication information is not limited in this embodiment of this application. For example, the broadcast message may include a MIB; and the system message may include a SIB 1, a SIB 2, a SIB 3, or a SIB 4.

It should be noted that the first information, the second information, and the third information may be sent in one message, or may be sent in different messages. For example, the first information, the second information, and the third information are sent in a same system message. For example, the first information is sent in a system message, and the second information and the third information are sent in a broadcast message. Alternatively, for example, the first information is sent in a system message, and the second information and the third information are sent in another system message. This is not limited in this embodiment of this application. In addition, the fourth information and the fifth information may be sent together with the first information, the second information, and the third information in one message, or may be sent in a separate message. This is not limited in this embodiment of this application. In addition, the first indication information, the second indication information, and the third indication information may be sent in one message, or may be sent in different messages. This is not limited in this embodiment of this application.

S104: The terminal device receives the effective carrier indication information.

S105: The terminal device obtains the effective carrier frequency.

The terminal device obtains the effective carrier frequency based on the effective carrier indication information. For example, as shown in FIG. 8B, it is determined, based on the first information, that effective carriers are paired carriers, where a paired carrier frequency spacing is $f_d$; it is determined, based on the second information, that the start carrier frequency is $f_s$; and it is determined, based on the first information, the second information, and the third information, that effective carrier frequencies include $f_s$, $f_1$, $f_2$, $f_3$, $f_4$, $f_5$, . . . , and $f_{32}$, and $f_s+f_d$, $f_1+f_d$, $f_2+f_d$, $f_3+f_d$, $f_4+f_d$, $f_5+f_d$, . . . , and $f_{32}+f_d$.

In addition, the terminal device may further obtain a frequency of a third effective carrier. The third effective carrier includes a carrier carrying a synchronization signal and a carrier carrying a PBCH.

In an implementation, the terminal device performs blind detection on a plurality of carriers indicated by a preset carrier frequency set, to obtain the synchronization signal. In this case, the terminal device determines a frequency of the carrier carrying the synchronization signal.

For example, the carrier frequency set may be all or a part of an available frequency list that is for a synchronization signal in a country and that is preset for a terminal device. For example, the carrier frequency set is shown in Table 4. The terminal device performs the blind detection on six carriers shown in Table 4, obtains the synchronization signal on a carrier whose frequency is 406.4250 MHz, and then determines that the frequency of the carrier carrying the synchronization signal is 406.4250 MHz.

Further, the terminal device obtains a carrier frequency of the PBCH based on the carrier frequency of the synchronization signal.

In an implementation, the carrier frequency of the PBCH and the carrier frequency of the synchronization signal satisfy a preset relationship. For example, a frequency spacing between the carrier frequency of the PBCH and the carrier frequency of the synchronization signal is 50 kHz.

In another implementation, the terminal device determines, based on the carrier frequency of the synchronization signal and a first preset value, the carrier frequency of the PBCH. The first preset value is a location difference between the carrier frequency of the synchronization signal and the carrier frequency of the PBCH that are in the carrier frequency set. For example, the second carrier frequency in Table 4 is the carrier frequency of the synchronization signal, and the first preset value is 1. In this case, the third carrier frequency in Table 4 is the carrier frequency of the PBCH.

TABLE 4

| Carrier frequency (unit: MHz) |
| --- |
| 406.1225 |
| 406.4250 |
| 407.0250 |
| 407.1500 |
| 407.5750 |
| 407.6000 |

If the effective carriers are paired carriers, the terminal device determines the frequency of the fourth effective carrier based on the carrier frequency of the synchronization signal, the fourth information, and the third indication information, and determines the frequency of the fifth effective carrier based on the carrier frequency of the PBCH, the fourth information, and the third indication information.

If it is determined, based on the fourth information, that the carrier of the synchronization signal is located in the high frequency band, the frequency of the fourth effective carrier is equal to the carrier frequency of the synchronization signal minus the paired carrier frequency spacing, and the frequency of the fifth effective carrier is equal to the carrier frequency of the PBCH minus the paired carrier frequency spacing.

If it is determined, based on the fourth information, that the carrier of the synchronization signal is located in the low frequency band, the frequency of the fourth effective carrier is equal to the carrier frequency of the synchronization signal plus the paired carrier frequency spacing, and the frequency of the fifth effective carrier is equal to the carrier frequency of the PBCH plus the paired carrier frequency spacing.

Further, the terminal device determines the duplex mode based on the fifth information. When the duplex mode is the FDD, if it is determined that the carrier of the synchronization signal is located in the high frequency band, it is determined that a carrier that is of the effective carrier and that is located in the high frequency band is a downlink carrier, and a carrier that is of the effective carrier and that is located in the low frequency band is an uplink carrier; or if it is determined that the carrier of the synchronization signal is located in the low frequency band, it is determined that a carrier that is of the effective carrier and that is located in the low frequency band is a downlink carrier, and a carrier that is of the effective carrier and that is located in the high frequency band is an uplink carrier.

Figure 10A:
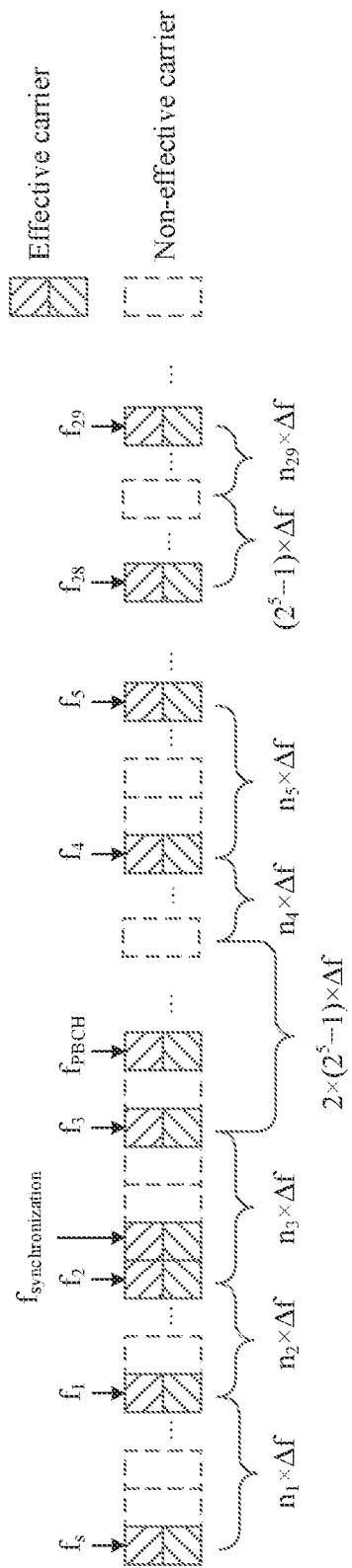
FIG. 10A is a schematic diagram 5 of an effective carrier indication method according to an embodiment of this application.
Figure 11A:
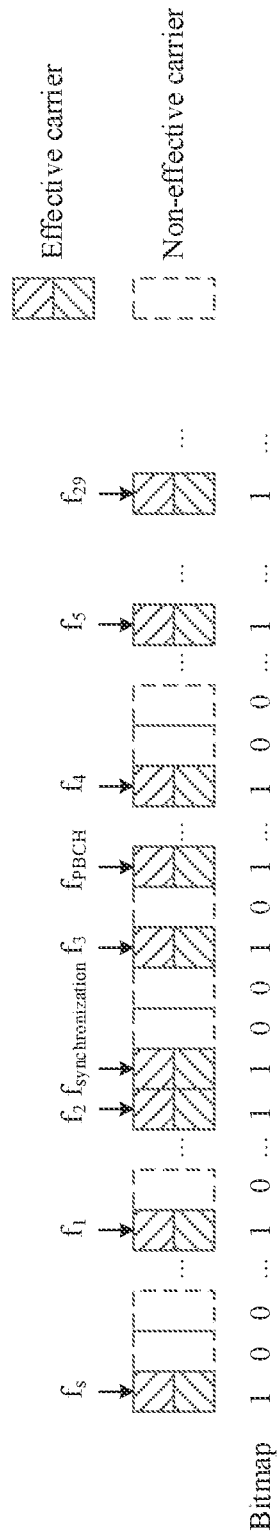
FIG. 11A is a schematic diagram 4 of another effective carrier indication method according to an embodiment of this application.

For example, an effective carrier is an unpaired carrier, and the effective carrier determined based on the first information, the second information, and the third information is shown in FIG. 10A or FIG. 11A. The effective carrier frequencies include a total of 32 start carrier frequencies $f_s$, $f_1$, $f_2$, $f_3$, $f_4$, $f_5$, ..., $f_{29}$, $f_{synchronization}$, and $f_{PBCH}$.

Figure 10B:
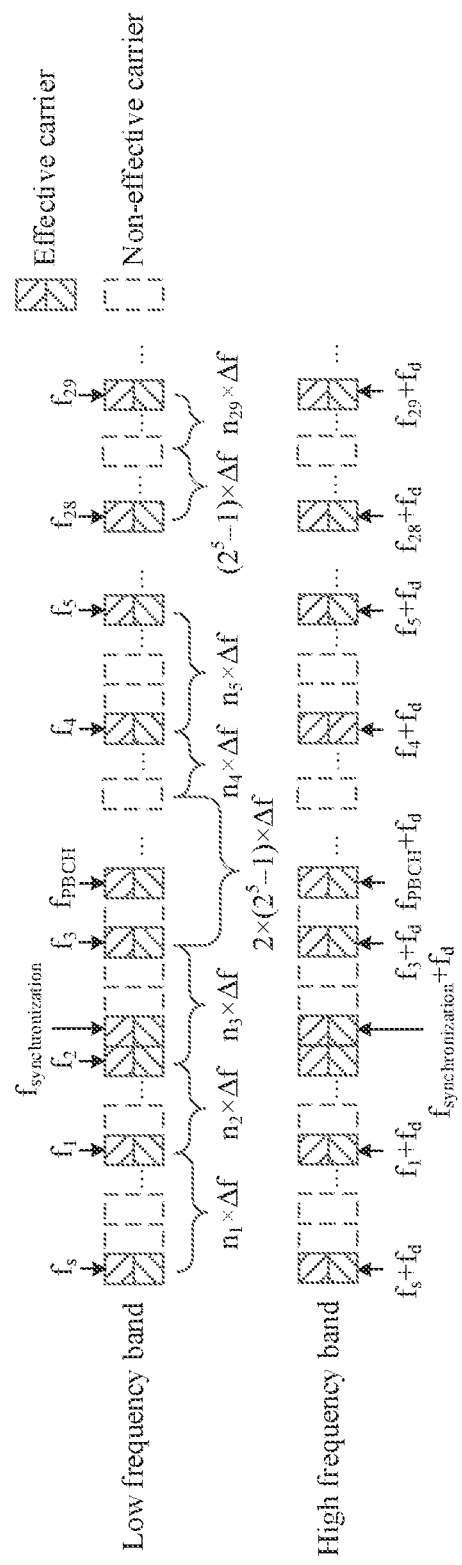
FIG. 10B is a schematic diagram 6 of an effective carrier indication method according to an embodiment of this application.
Figure 11B:
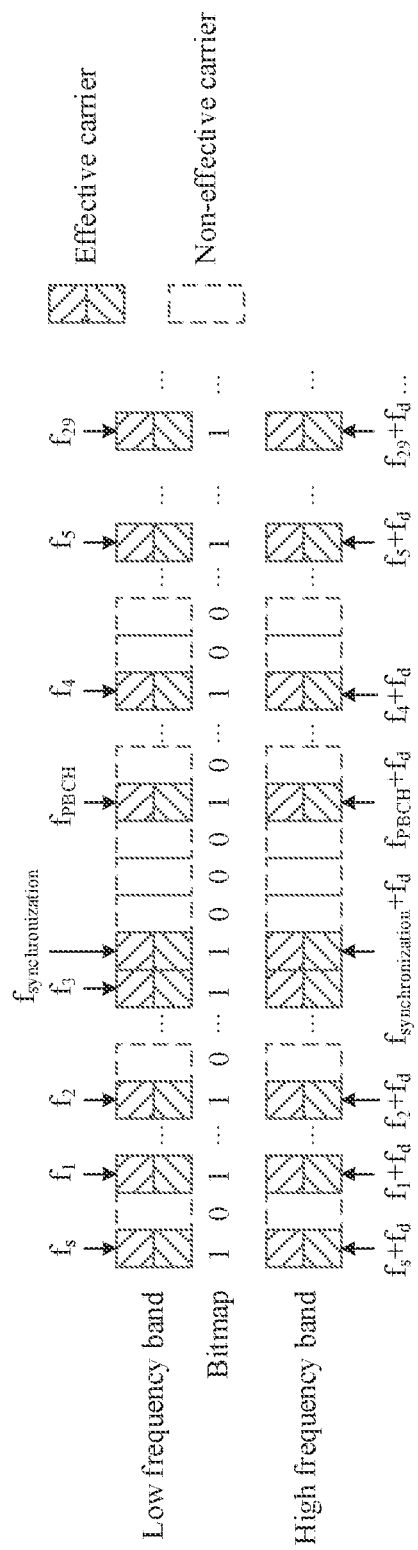
FIG. 11B is a schematic diagram 5 of another effective carrier indication method according to an embodiment of this application.

For example, effective carriers are paired carriers, the duplex mode is the TDD, the carrier frequency of the synchronization signal is located in the low frequency band, and the effective carriers determined based on the first information, the second information, the third information, the fourth information, and the fifth information are shown in FIG. 10B or FIG. 11B. The effective carrier frequencies include a total of 64 effective carrier frequencies, namely, frequencies $f_s$, $f_1$, $f_2$, $f_3$, $f_4$, $f_5$, ..., and $f_{29}$ of first effective carriers, frequencies $f_s+f_d$, $f_1+f_d$, $f_2+f_d$, $f_3+f_d$, $f_4+f_d$, $f_5+f_d$, ..., and $f_{29}+f_d$ of second effective carriers, frequencies $f_{synchronization}$ and $f_{PBCH}$ of third effective carriers, a frequency $f_{synchronization}+f_d$ of a fourth effective carrier, and a frequency $f_{PBCH}+f_d$ of a fifth effective carrier.

Figure 10C:
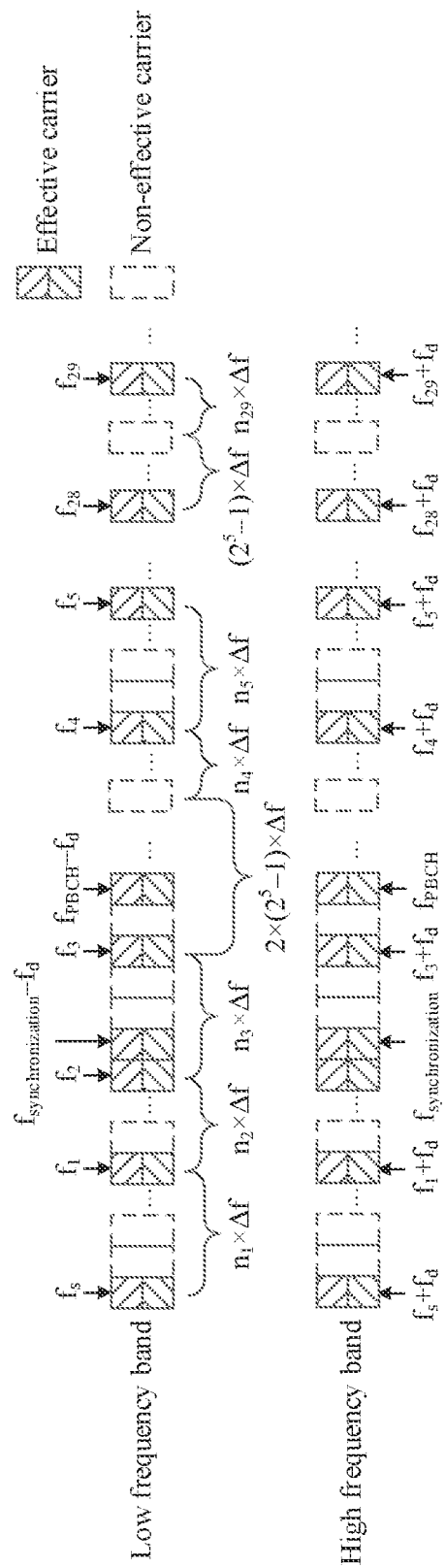
FIG. 10C is a schematic diagram 7 of an effective carrier indication method according to an embodiment of this application.
Figure 11C:
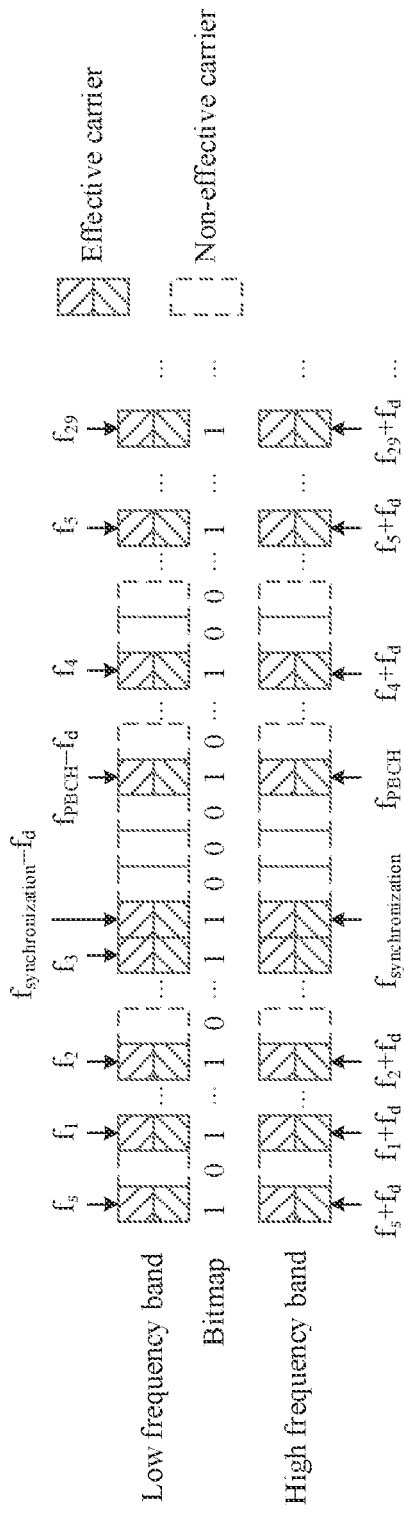
FIG. 11C is a schematic diagram 6 of another effective carrier indication method according to an embodiment of this application.

For example, effective carriers are paired carriers, the duplex mode is the TDD, the carrier frequency of the synchronization signal is located in the high frequency band, and the effective carriers determined based on the first information, the second information, the third information, the fourth information, and the fifth information are shown in FIG. 10C or FIG. 11C. The effective carrier frequencies include a total of 64 effective carrier frequencies, namely, frequencies $f_s$, $f_1$, $f_2$, $f_3$, $f_4$, $f_5$, ..., and $f_{29}$ of first effective carriers, frequencies $f_s+f_d$, $f_1+f_d$, $f_2+f_d$, $f_3+f_d$, $f_4+f_d$, $f_5+f_d$, ..., and $f_{29}+f_d$ of second effective carriers, frequencies $f_{synchronization}$ and $f_{PBCH}$ of third effective carriers, a frequency $f_{synchronization}-f_d$ of a fourth effective carrier, and a frequency $f_{PBCH}-f_d$ of a fifth effective carrier.

Figure 10D:
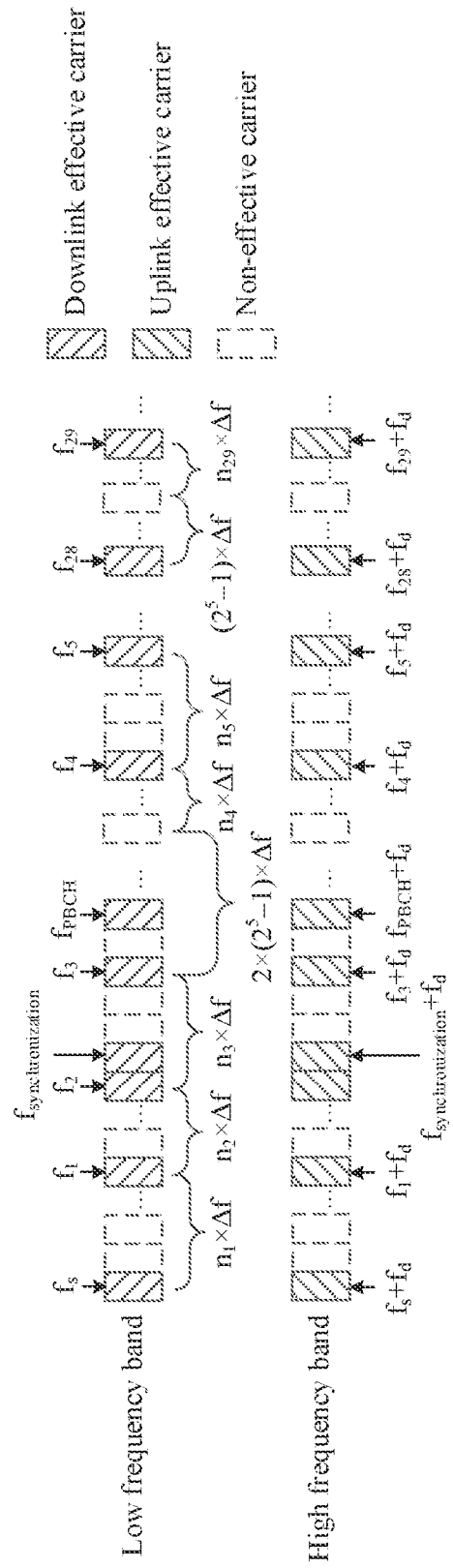
FIG. 10D is a schematic diagram 8 of an effective carrier indication method according to an embodiment of this application.
Figure 11D:
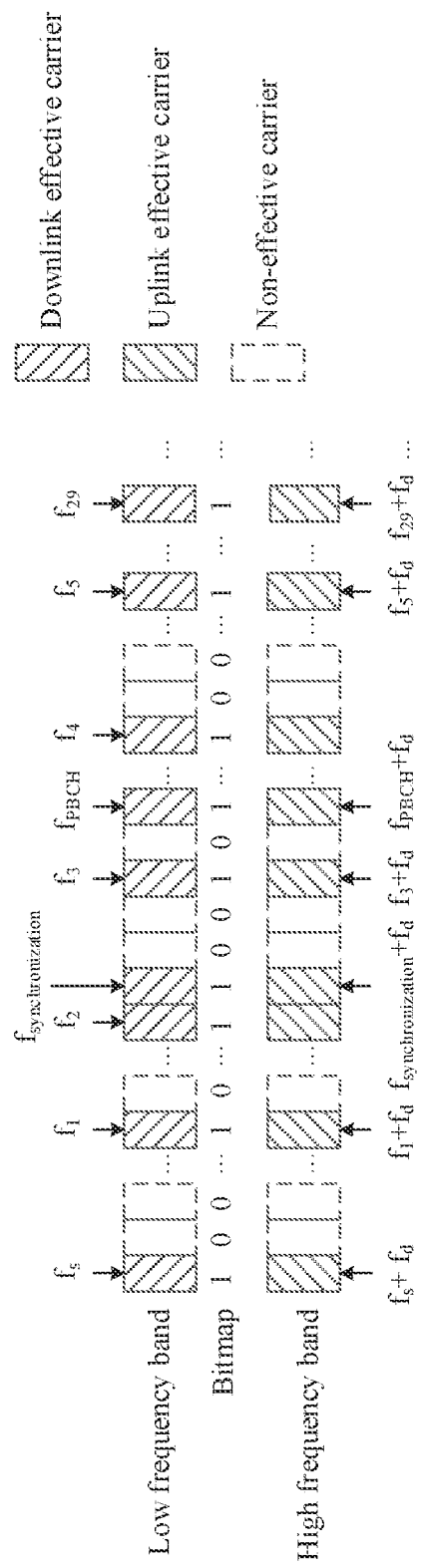
FIG. 11D is a schematic diagram 7 of another effective carrier indication method according to an embodiment of this application.

For example, effective carriers are paired carders, the duplex mode is the FDD, the carrier frequency of the synchronization signal is located in the low frequency band, and the effective carriers determined based on the first information, the second information, the third information, the fourth information, and the fifth information are shown in FIG. 10D or FIG. 11D. The effective carrier frequencies include a total of 64 effective carrier frequencies, namely, frequencies $f_s$, $f_1$, $f_2$, $f_3$, $f_4$, $f_5$, ..., and $f_{29}$ of first effective carriers, frequencies $f_s+f_d$, $f_1+f_d$, $f_2+f_d$, $f_3+f_d$, $f_4+f_d$, $f_5+f_d$, ..., and $f_{29}+f_d$ of second effective carriers, frequencies $f_{synchronization}$ and $f_{PBCH}$ of third effective carriers, a frequency $f_{synchronization}+f_d$ of a fourth effective carrier, and a frequency $f_{PBCH}+f_d$ of a fifth effective carrier. Carriers corresponding to the frequencies of the first effective carriers and the frequencies of the third effective carriers are downlink effective carriers. Carriers corresponding to the frequencies of the second effective carriers, the frequency of the fourth effective carrier, and the frequency of the fifth effective carrier are uplink effective carriers.

Figure 10E:
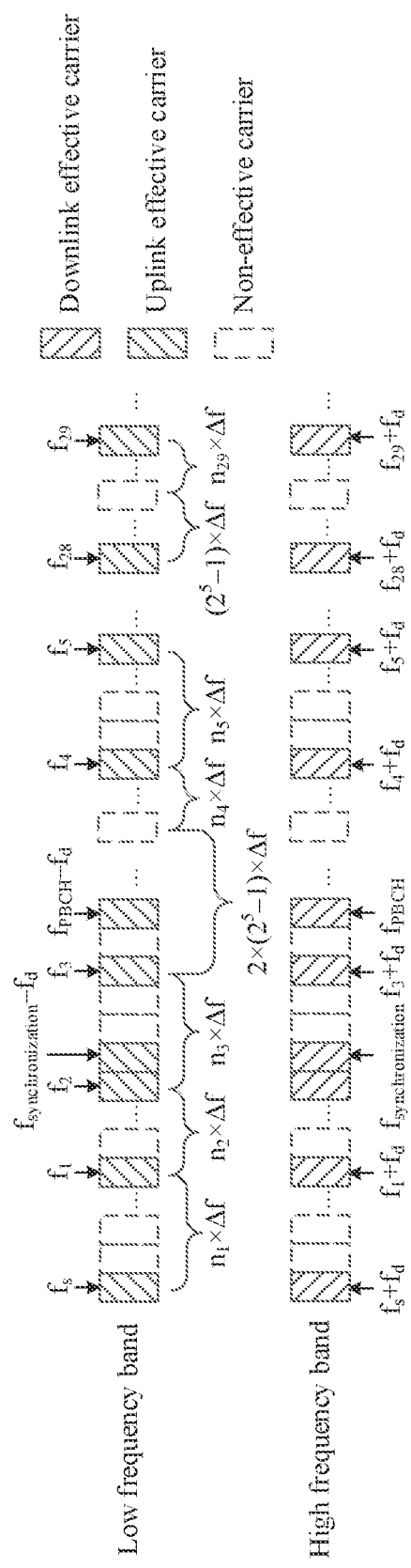
FIG. 10E is a schematic diagram 9 of an effective carrier indication method according to an embodiment of this application.
Figure 11E:
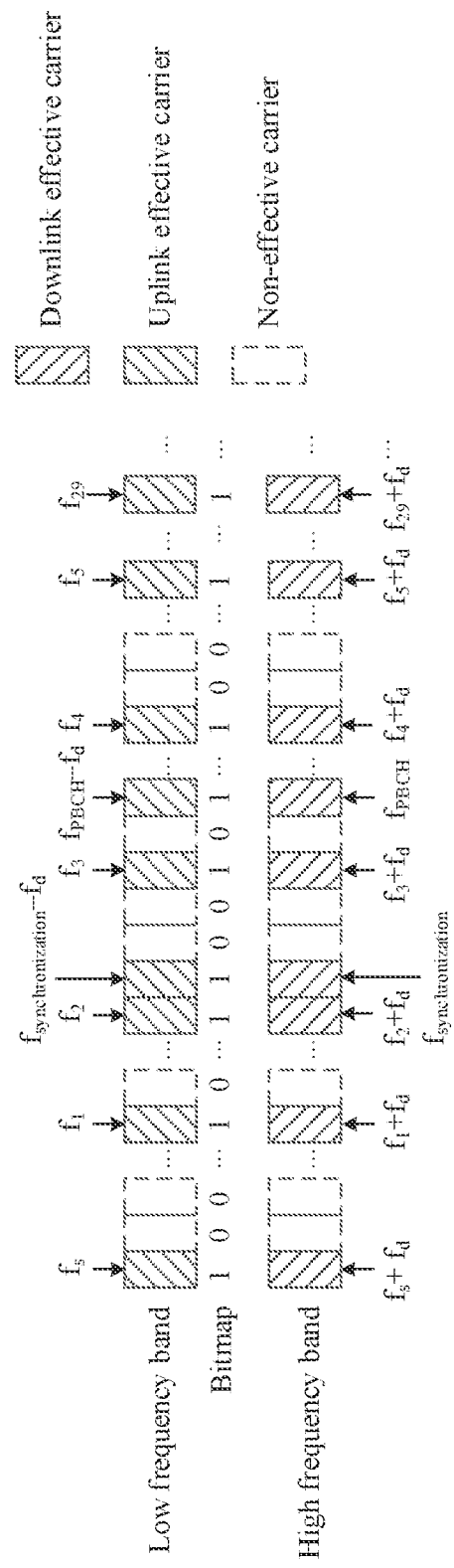
FIG. 11E is a schematic diagram 8 of another effective carrier indication method according to an embodiment of this application.

For example, effective carriers are paired carriers, the duplex mode is the FDD, the carrier frequency of the synchronization signal is located in the high frequency hand, and the effective carriers determined based on the first information, the second information, the third information, the fourth information, and the fifth information are shown in FIG. 10E or FIG. 11E. The effective carrier frequencies include a total of 64 effective carrier frequencies, namely, frequencies $f_s$, $f_1$, $f_2$, $f_3$, $f_4$, $f_5$, ..., and $f_{29}$ of first effective carriers, frequencies $f_s+f_d$, $f_1+f_d$, $f_2+f_d$, $f_3+f_d$, $f_4+f_d$, $f_5+f_d$, ..., and $f_{29}+f_d$ of second effective carriers, frequencies $f_{synchronization}$ and $f_{PBCH}$ of third effective carriers, a frequency $f_{synchronization}-f_d$ of a fourth effective carrier, and a frequency $f_{PBCH}-f_d$ of a fifth effective carrier. Carriers corresponding to the frequencies of the second effective carriers and the frequencies of the third effective carriers are downlink effective carriers. Carriers corresponding to the frequencies of the first effective carriers, the frequency of the fourth effective carrier, and the frequency of the fifth effective carrier are uplink effective carriers.

According to the communications method provided in this embodiment of this application, the network device sends the effective frequency indication information to the terminal device, to indicate information such as whether effective carriers are paired, a duplex mode, a start carrier frequency, and a location relationship between an effective carrier frequency and the start carrier frequency, so as to indicate the terminal device to obtain the effective carrier frequency. The communications method can be flexibly applied to various complex effective carrier distribution, and reduce signaling overheads between the network device and the terminal device.

The foregoing mainly describes the solutions provided in the embodiments of this application from a perspective of interaction between the network device and the terminal device. It may be understood that, to implement the foregoing functions, the network device and the terminal device include corresponding hardware structures and/or software modules for implementing the functions. A person skilled in the art should be easily aware that units and algorithm steps in the examples described with reference to the embodiments disclosed in this specification can be implemented by hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, division into function modules may be performed on the network device and the terminal device based on the foregoing method examples. For example, each function module may be obtained through division corresponding to each function, or two or more functions may be integrated into one processing module. The integrated module may be implemented in a form of hardware, or may be implemented in a form of a software function module. It should be noted that, in the embodiments of this application, division into the modules is an example, and is merely logic function division. In an actual implementation, another division manner may be used. An example in which function modules are obtained through division based on functions is used below for description.

Figure 12:
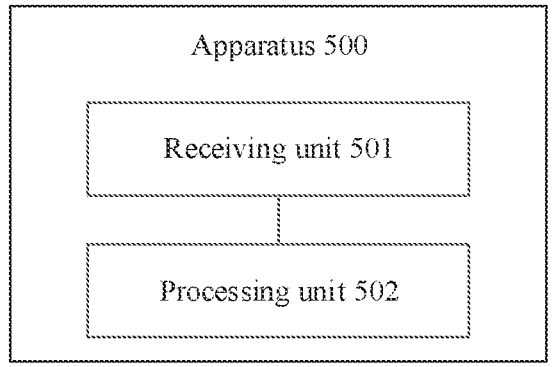
FIG. 12 is a schematic structural diagram of a terminal device according to an embodiment of this application.

FIG. 12 is a schematic diagram of a logical structure of an apparatus 500 according to an embodiment of this application. The apparatus 500 may be a terminal device, and can implement a function of the terminal device in the method provided in the embodiments of this application. The apparatus 500 may alternatively be an apparatus that can support a terminal device in implementing a function of the terminal device in the method provided in the embodiments of this application. The apparatus 500 may be a hardware structure, a software module, or a combination of a hardware structure and a software module. The apparatus 500 may be implemented by using a chip system. In this embodiment of this application, the chip system may include a chip, or may include a chip and another discrete component. As shown in FIG. 12, the apparatus 500 includes a receiving unit 501 and a processing unit 502. The receiving unit 501 may be configured to: perform S104 in FIG. 4, and/or perform another step described in this application. The processing unit 502 may be configured to: perform S105 in FIG. 4, and/or perform another step described in this application. The receiving unit may also be referred to as a receiving module or another name, and the processing unit may also be referred to as a processing module or another name.

All related content of the steps in the foregoing method embodiments may be cited in descriptions of functions of the corresponding function modules. Details are not described herein again.

Figure 13:
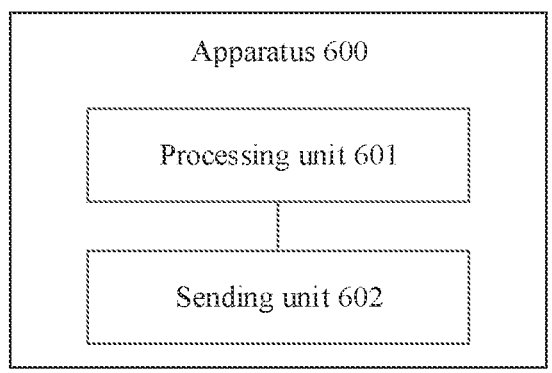
FIG. 13 is a schematic structural diagram of a network device according to an embodiment of this application.

FIG. 13 is a schematic diagram of a logical structure of an apparatus 600 according to an embodiment of this application. The apparatus 600 may be a network device, and can implement a function of the network device in the method provided in the embodiments of this application. The apparatus 600 may alternatively be an apparatus that can support a network device in implementing a function of the network device in the method provided in the embodiments of this application. The apparatus 600 may be a hardware structure, a software module, or a combination of a hardware structure and a software module. As shown in FIG. 13, the apparatus 600 includes a processing unit 601 and a sending unit 602. The processing unit 601 may be configured to: perform S101 and S102 in FIG. 4, and/or perform another step described in this application. The sending unit 602 may be configured to: perform S103 in FIG. 4, and/or perform another step described in this application. The processing unit may also be referred to as a processing module or another name, and the sending unit may also be referred to as a sending module or another name.

All related content of the steps in the foregoing method embodiments may be cited in descriptions of functions of the corresponding function modules. Details are not described herein again.

In the embodiments, the apparatus 500 or the apparatus 600 may be presented in a form of function modules obtained through division in an integrated manner. The "module" herein may be a specific ASIC, a circuit, a processor and a storage device that execute one or more software or firmware programs, an integrated logic circuit, and/or another component that can provide the foregoing functions.

Figure 14:
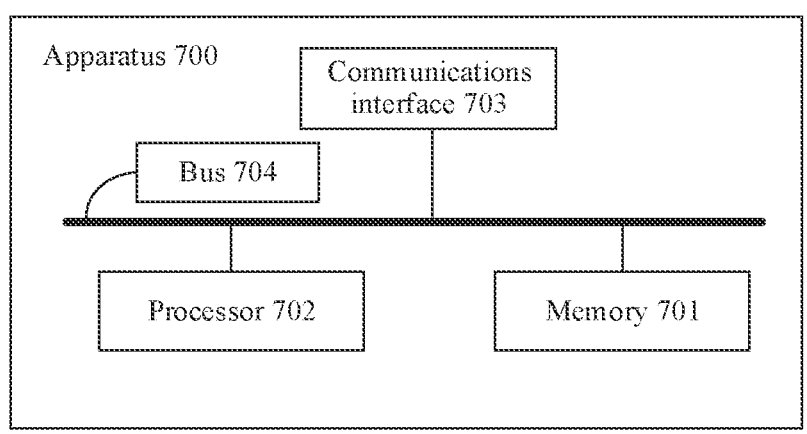
FIG. 14 is a schematic structural diagram of a communications apparatus according to an embodiment of this application.

In some embodiments, the apparatus 500 or the apparatus 600 may be in a form shown in FIG. 14.

As shows in FIG. 14, an apparatus 700 may include a memory 701, a processor 702, and a communications interface 703. The memory 702 is configured to store instructions. When the apparatus 700 runs, the processor 702 executes the instructions stored in the memory 701, so that the apparatus 700 performs the communications method provided in the embodiments of this application. The memory 701, the processor 702, and the communications interface 703 are in communications connection through a bus 704. For a specific communications method, refer to the foregoing related descriptions and related descriptions in the accompanying drawings. Details are not described herein again. It should be noted that, in a specific implementation process, the apparatus 700 may further include another hardware component, which is not enumerated one by one in this specification. In a possible implementation, the memory 701 may alternatively be included in the processor 702.

In an example of this application, the processing unit 502 in FIG. 12 or the processing unit 601 in FIG. 13 may be implemented by using the processor 701, and the receiving unit 501 in FIG. 12 or the sending unit 602 in FIG. 13 may be implemented by using the communications interface 703.

The communications interface 703 may be a circuit, a component, an interface, a bus, a software module, a transceiver, or any other apparatus that can implement communication. The processor 702 may be a field programmable gate array (FPGA), an application-specific integrated circuit (ASIC), a system on chip (SoC), a central processing unit (CPU), a network processor (NP), a digital signal processor (DSP), or a micro controller unit (MCU), and a programmable logic device (PLD) or another integrated chip may alternatively be used. The memory 701 includes a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories. The memory may alternatively include any other apparatus having a storage function, for example, a circuit, a component, or a software module.

The apparatus provided in this embodiment of this application may be configured to perform the foregoing communications method. Therefore, for technical effects that can be obtained by the apparatus, refer to the foregoing method embodiments. Details are not described herein again.

A person of ordinary skill in the art may understand that all or some of the steps of the foregoing method may be implemented by hardware related to instructions of a program. The program may be stored in a computer-readable storage medium. The computer-readable storage medium includes a ROM, a RAM, an optical disc, and the like.

An embodiment of this application further provides a storage medium. The storage medium may include the memory 701.

For explanations and beneficial effects of related content in any one of the foregoing provided apparatuses, refer to a corresponding method embodiment provided above. Details are not described herein again.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, all or some of the procedures or functions according to the embodiments of this application are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a good effect.

Although this application is described with reference to specific features and the embodiments thereof, it is clear that various modifications and combinations may be made to this application without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. In this way, if these modifications and variations to this application fall within the scope of the claims of this application and their equivalent technologies, this application is also intended to cover these modifications and variations.

What is claimed is:

1. A communications method, wherein the method comprises:
   obtaining effective carrier indication information from a network device, wherein:
      the effective carrier indication information comprises first information, second information, and third information;
      the first information comprises first indication information, second indication information, or third indication information;
      the first indication information is used to indicate that carriers are not paired;
      the second indication information is used to indicate that the carriers are paired;
      the third indication information is used to indicate a frequency spacing between paired carriers;
      the second information is used to indicate a start carrier frequency; and
      the third information is used to indicate a frequency domain location of an effective carrier relative to a start carrier, wherein the effective carrier comprises a third effective carrier;
   performing blind detection on a plurality of carriers indicated by a preset carrier frequency set, to obtain a synchronization signal;
   obtaining a frequency of the third effective carrier based on the synchronization signal, wherein the third effective carrier comprises a carrier carrying the synchronization signal and a carrier carrying a physical broadcast channel (PBCH); and
   obtaining an effective carrier frequency based on the effective carrier indication information.

2. The method according to claim 1, wherein:
   the third information comprises fourth indication information, wherein:
      when the first information comprises the first indication information, the fourth indication information is used to indicate the effective carrier frequency; or
      when the first information comprises the second indication information or the third indication information, the fourth indication information is used to indicate a frequency of a first effective carrier, and wherein:
      the effective carrier comprises w first effective carriers and w second effective carriers that are in a one-to-one correspondence with each other, wherein a frequency spacing between one first effective carrier and one second effective carrier that are in a one-to-one correspondence with each other is the frequency spacing between paired carriers, and w>0.

3. The method according to claim 2, wherein:
   the fourth indication information comprises L bits, the L bits comprise q indication values, and the q indication values are used to indicate carrier frequencies of q or less than q effective carriers, wherein:
an $i^{th}$ indication value is used to indicate that a frequency of an $i^{th}$ effective carrier is: $(n_i+(t_i-1)\times(2^m-1))\times\Delta f+f_{i-1}$, wherein:
the $i^{th}$ indication value comprises $t_i\times m$ bits, i=1, 2, . . . , q, 1<=q<=L/m, $$L>=\sum_{i=1}^{q} t_i \times m > 0,$$

a value of $n_i$ is indicated by a $((t_i-1)\times m+1)^{th}$ bit to a $(t_i\times m)^{th}$ bit to a $(t_i\times m)^{th}$ bit that are of the $i^{th}$ indication value, and $\Delta f$ is a carrier or subcarrier frequency spacing; and
when i>1, $f_{i-1}$ is an effective carrier frequency indicated by an $(i-1)^{th}$ indication value; or
when i=1, $f_{i-1}$ is the start carrier frequency.

4. The method according to claim 2, wherein:
a location difference between a carrier frequency of the synchronization signal and a carrier frequency of the PBCH that are in the preset carrier frequency set is a first preset value.

5. The method according to claim 1, wherein:
the third information comprises fifth indication information, the fifth indication information comprises Z bits, Z>0, and each of the Z bits comprises a respective first value or a respective second value;
when the first information comprises the second indication information or the third indication information,
an $r^{th}$ bit of the Z bits is indicated by a first value, wherein a carrier frequency with a frequency spacing that is between the start carrier frequency and the carrier frequency and that is equal to a carrier or subcarrier frequency spacing multiplied by r is a frequency of a first effective carrier; and
an $s^{th}$ bit of the Z bits is indicated by a second value, wherein a carrier frequency with a frequency spacing that is between the start carrier frequency and the carrier frequency and that is equal to the carrier or subcarrier frequency spacing multiplied by s is not the frequency of the first effective carrier, wherein:
the effective carrier comprises w first effective carriers and w second effective carriers that are in a one-to-one correspondence with each other, and a frequency spacing between one first effective carrier and one second effective carrier that are in a one-to-one correspondence with each other is the frequency spacing between paired carriers; and
w>0, w>r>=0, and w>s>=0.

6. The method according to claim 1, wherein:
when the first information comprises the first indication information, the effective carrier comprises the start carrier; or
when the first information comprises the second indication information or the third indication information, the effective carrier comprises the start carrier and a carrier whose frequency spacing from the start carrier is the frequency spacing between paired spacing carriers.

7. The method according to claim 1, wherein the obtaining the frequency of the third effective carrier based on the synchronization signal comprises:
determining, based on a carrier frequency of the synchronization signal and a first preset value, a carrier frequency of the PBCH, wherein the first preset value is a location difference between the carrier frequency of the synchronization signal and the carrier frequency of the PBCH that are in the preset carrier frequency set.

8. The method according to claim 7, wherein when the first information comprises the second indication information or the third indication information,
the effective carrier further comprises a fourth effective carrier, and a frequency spacing between a frequency of the fourth effective carrier and the carrier frequency of the synchronization signal is the frequency spacing between paired carriers; and
the effective carrier further comprises a fifth effective carrier, and a frequency spacing between a frequency of the fifth effective carrier and the carrier frequency of the PBCH is the frequency spacing between paired carriers.

9. The method according to claim 8, wherein:
the effective carrier indication information further comprises fourth information, the fourth information is used to indicate a frequency band location of a carrier of the synchronization signal, and the frequency band location comprises a high frequency band or a low frequency band; and
if the carrier of the synchronization signal is located in the high frequency band, the frequency of the fourth effective carrier is equal to the carrier frequency of the synchronization signal minus the frequency spacing between paired carriers, and the frequency of the fifth effective carrier is equal to the carrier frequency of the PBCH minus the frequency spacing between paired carriers; or
if the carrier of the synchronization signal is located in the low frequency band, the frequency of the fourth effective carrier is equal to the carrier frequency of the synchronization signal plus the frequency spacing between paired carriers, and the frequency of the fifth effective carrier is equal to the carrier frequency of the PBCH plus the frequency spacing between paired carriers.

10. The method according to claim 9, wherein:
the effective carrier indication information further comprises fifth information, the fifth information is used to indicate a duplex mode, and the duplex mode comprises time division duplex (TDD) or frequency division duplex (FDD).

11. The method according to claim 10, wherein when the duplex mode is the FDD,
if the carrier of the synchronization signal is located in the high frequency band, a carrier that is of the effective carrier and that is located in the high frequency band is a downlink carrier, and a carrier that is of the effective carrier and that is located in the low frequency band is an uplink carrier; or
if the carrier of the synchronization signal is located in the low frequency band, a carrier that is of the effective carrier and that is located in the low frequency band is the downlink carrier, and a carrier that is of the effective carrier and that is located in the high frequency band is the uplink carrier.

12. The method according to claim 1, wherein
the effective carrier indication information is sent by using a system message or a broadcast message.

13. A communications apparatus, comprising:
a non-transitory memory storage comprising computer-executable instructions; and one or more processors, wherein the one or more processors execute the computer-executable instructions to cause the communications apparatus to perform operations comprising:
  obtaining effective carrier indication information from a network device, wherein:
    the effective carrier indication information comprises first information, second information, and third information;
    the first information comprises first indication information, second indication information, or third indication information;
    the first indication information is used to indicate that carriers are not paired;
    the second indication information is used to indicate that the carriers are paired;
    the third indication information is used to indicate a frequency spacing between paired carriers;
    the second information is used to indicate a start carrier frequency; and
    the third information is used to indicate a frequency domain location of an effective carrier relative to a start carrier, wherein the effective carrier comprises a third effective carrier;
  performing blind detection on a plurality of carriers indicated by a preset carrier frequency set, to obtain a synchronization signal;
  obtaining a frequency of the third effective carrier based on the synchronization signal, wherein the third effective carrier comprises a carrier carrying the synchronization signal and a carrier carrying a physical broadcast channel (PBCH); and
  obtaining an effective carrier frequency based on the effective carrier indication information.

14. The apparatus according to claim 13, wherein:
the third information comprises fourth indication information, wherein:
  when the first information comprises the first indication information, the fourth indication information is used to indicate the effective carrier frequency; or
  when the first information comprises the second indication information or the third indication information, the fourth indication information is used to indicate a frequency of a first effective carrier, wherein the effective carrier comprises w first effective carriers and w second effective carriers that are in a one-to-one correspondence with each other, and wherein a frequency spacing between one first effective carrier and one second effective carrier that are in a one-to-one correspondence with each other is the frequency spacing between paired carriers, and w>0.

15. The apparatus according to claim 14, wherein:
the fourth indication information comprises L bits, the L bits comprise q indication values, and the q indication values are used to indicate carrier frequencies of q or less than q effective carriers, wherein
  an $i^{th}$ indication value is used to indicate that a frequency of an ith effective carrier is: $(n_i+(t_i-1)\times(2^m-1))\times \Delta f + f_{i-1}$, wherein:
    the $i^{th}$ indication value comprises $t_i \times m$ bits, i=1, 2, ..., q, $1 \le q \le L/m$, $$L >= \sum_{i=1}^{q} t_i \times m > 0,$$

a value of $n_i$ is indicated by a $((t_i-1)\times m+1)_{th}$ bit to a $(t_i \times m)^{th}$ bit that are of the $i^{th}$ indication value, and $\Delta f$ is a carrier or subcarrier frequency spacing; and
  when i>1, $f_{i-1}$ is an effective carrier frequency indicated by an $(i-1)^{th}$ indication value; or
  when i=1, $f_{i-1}$ is the start carrier frequency.

16. The apparatus according to claim 13, wherein:
the third information comprises fifth indication information, the fifth indication information comprises Z bits, Z>0, and each of the Z bits comprises a respective first value or a respective second value;
when the first information comprises the second indication information or the third indication information,
  an $r^{th}$ bit of the Z bits is indicated by a first value, wherein a carrier frequency with a frequency spacing that is between the start carrier frequency and the carrier frequency and that is equal to a carrier or subcarrier frequency spacing multiplied by r is a frequency of a first effective carrier; and
  an $s^{th}$ bit of the Z bits is indicated by a second value, wherein a carrier frequency with a frequency spacing that is between the start carrier frequency and the carrier frequency and that is equal to the carrier or subcarrier frequency spacing multiplied by s is not the frequency of the first effective carrier, wherein:
    the effective carrier comprises w first effective carriers and w second effective carriers that are in a one-to-one correspondence with each other, and a frequency spacing between one first effective carrier and one second effective carrier that are in a one-to-one correspondence with each other is the frequency spacing between paired carriers; and
    w>0, w>r>=0, and w>s>=0.

17. The apparatus according to claim 13, wherein:
when the first information comprises the first indication information, the effective carrier comprises the start carrier; or
when the first information comprises the second indication information or the third indication information, the effective carrier comprises the start carrier and a carrier whose frequency spacing from the start carrier is the frequency spacing between paired carriers.

18. A communications method, wherein the method comprises:
  determining effective carrier indication information, wherein:
    the effective carrier indication information is used by a terminal device to determine an effective carrier frequency;
    the effective carrier indication information comprises first information, second information, and third information;
    the first information comprises first indication information, second indication information, or third indication information;
    the first indication information is used to indicate that carriers are not paired;
    the second indication information is used to indicate that the carriers are paired;
    the third indication information is used to indicate a frequency spacing between paired carriers;
    the second information is used to indicate a start carrier frequency; and
    the third information is used to indicate a frequency domain location of an effective carrier relative to a start carrier, wherein the effective carrier comprises a third effective carrier, the third effective carrier comprises a carrier carrying a synchronization signal and a carrier carrying a physical broadcast channel (PBCH), the synchronization signal is obtained by the terminal device through a blind detection on a plurality of carriers indicated by a preset carrier frequency set, and a frequency of the third effective carrier is obtained by the terminal device based on the synchronization signal; and sending the effective carrier indication information to the terminal device.

19. The method according to claim 18, wherein:
the third information comprises fourth indication information, wherein:
when the first information comprises the first indication information, the fourth indication information is used to indicate the effective carrier frequency; or
when the first information comprises the second indication information or the third indication information, the fourth indication information is used to indicate a frequency of a first effective carrier, and wherein:
the effective carrier comprises w first effective carriers and w second effective carriers that are in a one-to-one correspondence with each other, wherein a frequency spacing between one first effective carrier and one second effective carrier that are in a one-to-one correspondence with each other is the frequency spacing between paired carriers, and w>0.

* * * * *

UNITED STATES PATENT AND TRADEMARK OFFICE
CERTIFICATE OF CORRECTION

PATENT NO. : 12,149,485 B2
APPLICATION NO. : 17/366815
DATED : November 19, 2024
INVENTOR(S) : Yuchen Wang et al.

It is certified that error appears in the above-identified patent and that said Letters Patent is hereby corrected as shown below:

In the Claims

In Column 27, In Line 6, In Claim 3, delete "$t_i \times m$" and insert -- $t_i \times m$ --.

In Column 27, In Line 15, In Claim 3, before "that" delete "to a $(t_i \times m)^{th}$ bit".

In Column 27, In Line 61, In Claim 6, delete "spacing carriers." and insert -- carriers. --.

In Column 29, In Line 58 (Approx.), In Claim 15, delete "ith" and insert -- $i^{th}$ --.

In Column 29, In Line 60 (Approx.), In Claim 15, delete "$t_i \times m$" and insert -- $t_i \times m$ --.

In Column 30, In Line 1, In Claim 15, delete "$((t_i-1) \times m+1)_{th}$" and insert -- $((t_i-1) \times m+1)^{th}$ --.

Signed and Sealed this
Fourth Day of March, 2025

Coke Morgan Stewart
*Acting Director of the United States Patent and Trademark Office*